US007519163B2

(12) United States Patent
Cameron et al.

(10) Patent No.: US 7,519,163 B2
(45) Date of Patent: Apr. 14, 2009

(54) MULTICHANNEL CONTENT PERSONALIZATION SYSTEM AND METHOD

(75) Inventors: Timothy A. Cameron, Maple Grove, MN (US); Michael M. Lunzer, Eden Prairie, MN (US)

(73) Assignee: Warm Health, Inc., Wayzata, MN (US)

( * ) Notice: Subject to any disclaimer, the term of this patent is extended or adjusted under 35 U.S.C. 154(b) by 423 days.

(21) Appl. No.: 11/430,523

(22) Filed: May 9, 2006

(65) Prior Publication Data

US 2007/0274464 A1 Nov. 29, 2007

(51) Int. Cl.
*H04M 11/00* (2006.01)

(52) U.S. Cl. ........................................................ 379/38

(58) Field of Classification Search ................... 379/38, 379/93.13, 88.01, 88.16, 88.18; 600/300
See application file for complete search history.

(56) References Cited

U.S. PATENT DOCUMENTS 5,333,173 A * 7/1994 Seazholtz et al. ............. 379/38
2004/0034286 A1* 2/2004 Kasper et al. ............... 600/300
2005/0027536 A1 2/2005 Matos et al.

OTHER PUBLICATIONS

"Personalized Voice Solutions for the Healthcare Industry", 2006 Silverlink Communications, Inc.
"Pharos Innovations", 2002/2005.
"Personalized Voice Solutions for the Healthcare Industry", 2006 Silverlink Communications, Inc, Jun. 2006.

* cited by examiner

*Primary Examiner*—Stella L Woo
(74) *Attorney, Agent, or Firm*—Adriana S. Luedke; Dorsey & Whitney LLP

(57) ABSTRACT

A multichannel content personalization system and method provides for customized, automated telephone calls including audio programs, dialogues, and questions to be placed to seniors and other call recipients. Using the system and method, response data is collected from the call recipient during the telephone call. The information collected from the call recipients is provided to one or more caregivers. Caregivers may also provide information and communicate with the call recipients. Call recipients may be provided with opportunities to alter their call plan data by providing verbal responses during a call or by providing feedback in the form of mail responses to letters seeking feedback from the call recipient. A multichannel content personalization system for enabling communication between a caregiver and a call recipient includes a receiver for receiving prerecorded audio segment data, caregiver data and call recipient data; a storage device for storing the prerecorded audio segment data, caregiver data and call recipient data; a processor for generating call plan data based upon the call recipient data and prerecorded audio segment data; and a server for generating a telephone call to the call recipient by playing prerecorded audio segments to the call recipient in an order provided by the call plan data. The processor also receives response data from the call recipient during the telephone call and generates status data concerning the call recipient for the caregiver based upon the caregiver data and response data. The response data may include a spoken message provided by the call recipient during the telephone call The call plan data may be modified based upon changes made by the caregiver to the caregiver data or call recipient data or based upon the response data provided by the call recipient.

22 Claims, 20 Drawing Sheets

| Call flow | Spoken information | segment ID | voice talent | | Program | Segment |
|---|---|---|---|---|---|---|
| Greeting | Hello | 3 | Patty | system | female beginning | Greeting |
| Name | Mary | 789 | Patty | system | female beginning FCN | Name |
| System intro | This is warm Health | 78 | Patty | system | female beginning | System Intro |
| Program intro | Here is the weather.... | 87 | Patty | system | Weather PD | Program intro |
| Program | "the weather is going to be..... | 56 | Paul | ent | Weather PD | Program |
| Program ending | Hope you liked the weather. | 43 | Patty | system | Weather PD | Program ending |
| Good news photo | Photo's from | 57 | Patty | system | photo announcement | Good news |
| sponsor phrase | Son | 24 | Patty | system | photo announcement FCN | sponsor phrase |
| Good news photo completion | will be delivered..... | 37 | Patty | system | photo announcement | Good news completion |
| question intro | Now lets ask few questions | 87 | Patty | system | General health | question intro |
| question one | Are you feeling good today | 89 | Patty | system | General health | question FGT |
| question one response Yes | That's great | 123 | Patty | system | General health | question FGT response Yes |
| question two | Did you sleep well last night | 149 | Patty | system | General health | question SW |
| question two response No | I'm sorry | 175 | Patty | system | General health | question SW response No |
| Question two No follow up | Did you have to get up to go to the bathroom more than one time. | 201 | Patty | system | General health | Question SW No follow up |
| Question two fu response Yes/No | OK | 227 | Patty | system | General health | Question SW fu response Yes/No |
| question three | Does your back hurt today | 253 | Patty | system | General health | question BP |
| question three response Yes/no | OK | 279 | Patty | system | General health | question BP response Yes/no |
| Question ending | We should be moving along now. | 305 | Patty | system | General health | Question ending |
| Messenger access question | Would you like to send a message to your | 331 | Patty | system | Messenger | Messenger access question |
| sponsor phrase | Son | 357 | Patty | system | Messenger FCN | sponsor phrase |
| Messenger access question cont'd | today? | 383 | Patty | system | Messenger | Messenger access question cont'd |
| Messenger access response Yes | Please speak at the tone and press any key after you have finished the message. | 409 | Patty | system | Messenger | Messenger access response Yes |
| tone | | 435 | Patty | system | | tone |
| messenger verification of receipt | thank you | 461 | Patty | system | Messenger | messenger verification of receipt |
| messenger urgent question | would you like to sent that will urgent delivery? | 487 | Patty | system | Messenger | messenger urgent question |
| Call ending | Thank you for talking with me today........ | 513 | Patty | system | female closing | Call ending |

FIGURE 4

MULTICHANNEL CONTENT PERSONALIZATION SYSTEM AND METHOD

FIELD OF THE INVENTION

The present invention relates to multichannel content personalization system and method for providing customized automated telephone calls to one or more call recipients, gathering information from the call recipients, and providing the gathered information to one or more caregivers or other users to facilitate communication with and monitoring of the call recipients.

BACKGROUND OF THE INVENTION

As the number of seniors in the population increases, the challenges of serving the senior population are increasing. Seniors also are living longer and consuming increasing healthcare resources. Additionally, while the U.S. has advanced health and wellness knowledge, lack of effective means to deliver this knowledge to seniors results in an increasing number of preventable health-related incidents. This exacerbates the existing shortage of healthcare workers available to meet the needs of this growing population.

Increasingly, the role of caregiver for seniors is shifting to family members, relatives and friends. The physical separation of families and increase in workloads make supporting seniors within an extended family increasingly challenging. Therefore, caregivers are searching for tools that will enable them to contribute to the health and wellbeing of the person or people for whom they are responsible for providing care. Caregivers also are seeking ways to monitor and obtain information concerning the wellbeing of their senior or other cared-for individual.

In general, seniors are difficult to reach technologically. Relatively new technologies, such as web-based offerings over the Internet, have been slow to affect the health of the senior population. Few individuals age 65 and older use the Internet. So, although the Internet has proven to have great economic advantages in addressing communication issues, it is not an effective tool in reaching the senior population.

Consequently, there is a need for a communication system that enables caregivers to influence and monitor the health and wellbeing of a senior parent or other person for whom the caregiver is responsible. There is also a need for a communication system that provides seniors and other recipients information that may assist in improving their health and wellbeing in a way that is accessible and easily accepted by them, while also providing their caregiver(s) with valuable information concerning the level of wellbeing of the senior or other cared-for individual.

SUMMARY OF THE INVENTION

In view of the existing needs of seniors and their caregivers discussed above, a multichannel content personalization system in accordance with the present invention provides customized audio programs and other audio and printed information to one or more seniors and other cared-for individuals to influence their health and wellbeing. The system also collects information to assess and monitor their level of health or other aspects of their wellbeing. The information collected from the cared-for individuals is provided and/or made available to one or more caregivers electronically. Caregivers may also provide information and communicate with cared-for individuals via the system.

In a multichannel content personalization system according to the present invention, a telephone call generating system is provided that enables a user, for example, a caregiver, to request a series of customized automated telephone calls to be provided periodically to one or more cared-for individuals. Each customized telephone call is designed to provide an audio program to a senior or cared-for individual ("the call recipient") including, for example, an inspirational program, an educational program, a humorous program, or a religious or spiritual program as selected by the caregiver and/or call recipient. The telephone calls may also provide health-related information and instructions, such as a reminder to take daily medication. The telephone calls are further designed to ask the call recipient one or more questions, for example, concerning the health or daily routine of the call recipient, and to collect spoken response data from the call recipient using, for example, voice recognition technology or digital voice recording technology to enable storage of a recording of the spoken response data from the call recipient. The spoken response data is stored by the communication system and may be automatically provided to the caregiver, for example, via email, and/or may be accessible to the caregiver by accessing the stored data, for example, using a web-based browser to access a caregiver website provided as part of the communication system. Additional information about the substance of the customized telephone call and the call recipient's responses or behaviors may also be provided to or accessed by the caregiver. Also, a single caregiver may use the system to communicate with and monitor more than one call recipient. Calls and communication may be conducted in a variety of languages and formats as desired by the caregivers and call recipients.

Optionally, the communication system according to the present invention may also enable caregivers to provide recorded voice messages, letters, photos, and other items to the call recipient. Voice messages may be, for example, recorded using the caregiver's computer or via telephone and played to the call recipient as part of one or more customized telephone calls. Letters and photographs may be provided electronically by the caregiver to the communication system, for example, via email or downloading to a caregiver website, automatically integrated into a printed format by the communication system, and sent via mail to the call recipient.

Additionally, the communication system optionally may be programmed to generate automated alert messages to the caregiver, doctor, or other emergency contact upon the occurrence of circumstances defined by the caregiver. For example, failure to answer the telephone after a selected number of calls may trigger an alert message. Similarly, spoken responses given by the call recipient may also trigger an alert message.

The multichannel content personalization system according to the present invention enables caregivers to provide seniors and other call recipients with periodic, e.g., daily or weekly, positive emotional events and social experiences, to monitor and understand the level of wellbeing of the call recipient, to provide for increased care compliance for the call recipient, and to obtain talking points that will provide a basis for substantive conversations with the call recipient. Moreover, the multichannel content personalization system may provide a forum for caregivers to communicate with each other, for example, to exchange information or provide support for one another via a caregiver website.

Other organizations, such as healthcare organizations, may also desire to utilize the multichannel content personalization system according to the present invention to provide periodic calls to their customers to provide health and other information to targeted call recipients, obtain increased effectiveness of health management programs, reduce costs by improving healthcare of seniors and other call recipients, and/or create a stronger bond with their customers.

The multichannel content personalization system according to the present invention may also be used in other contexts where two parties want to communicate on a periodic basis and where digitally based communication is not desirable, effective, or possible for one of the two parties, such as when one party has access to a telephone but not a computer or other digital communication device, where users may design customized telephone calls to provide information and collect spoken data to be accessed digitally.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 4 provides a chart of an exemplary call plan created by call plan creation and modification component 203 in FIG. 2 or 3.

DETAILED DESCRIPTION OF THE INVENTION

The present invention will now be described in detail with reference to the accompanying drawings.

Figure 1:
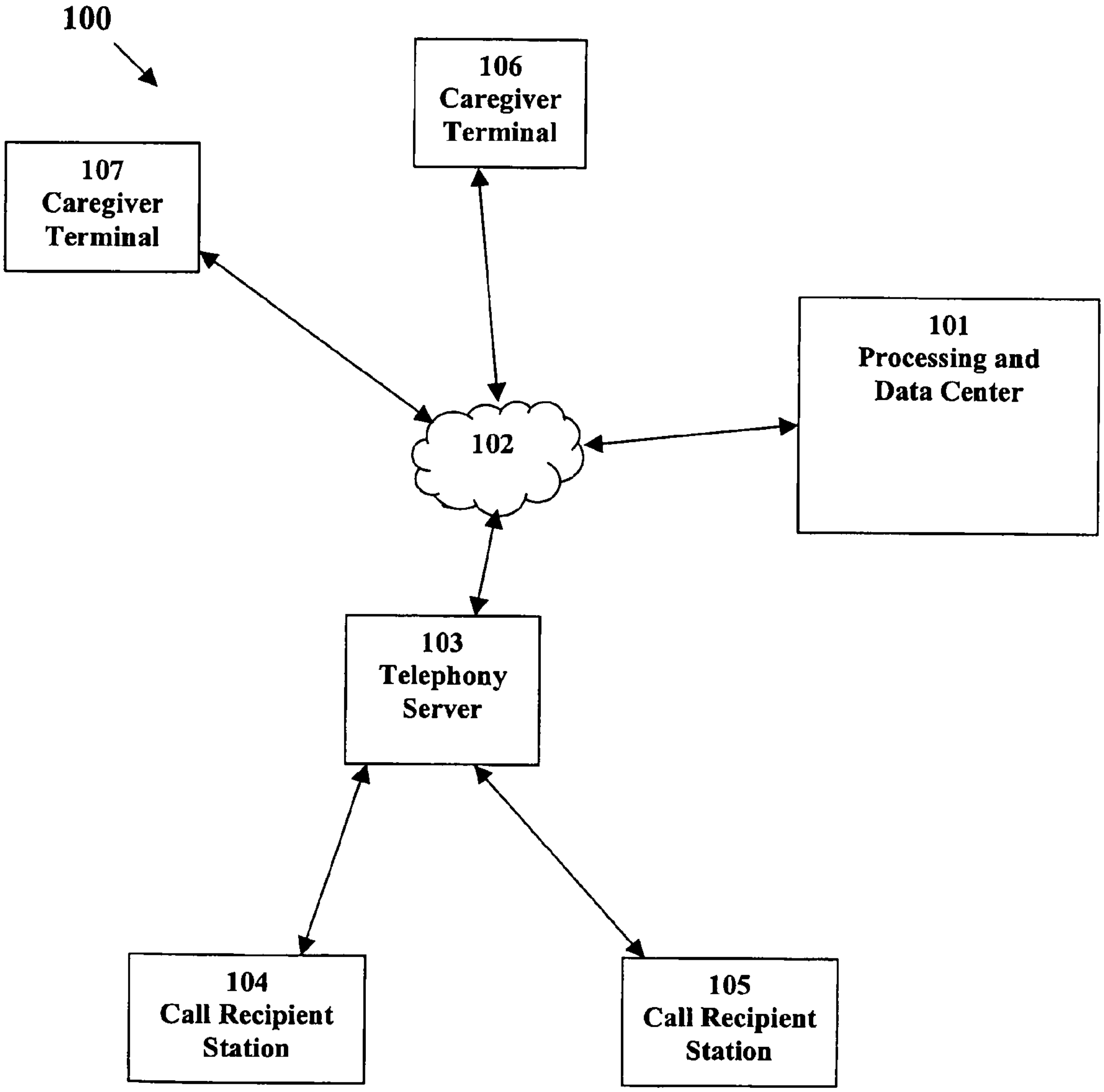
FIG. 1 provides a diagram of a multichannel content personalization system in accordance with the present invention.

FIG. 1 provides a diagram of a multichannel content personalization system 100, including a processing and data center 101, a network 102, a telephony server 103, exemplary call recipient stations 104 and 105 each consisting of a conventional telephone (wired or wireless), and exemplary caregiver terminals 106 and 107. The network 102 may be, for example, the Internet or any other type of network suitable for connecting the components of the system using wired or wireless communication methods. The caregiver terminals 106 and 107 may be, for example, PCs or other suitable computer terminals provided at locations such as caregiver homes or offices. The multichannel content personalization system shown in FIG. 1 is implemented to enable communication between the caregiver terminals, e.g., 106 and 107; the processing and data center 101; and the call recipient stations, e.g., 104 and 105, via telephony server 103.

The multichannel content personalization system 100 may include a plurality of caregiver terminals, a plurality of call recipient stations, a plurality of telephone servers, and a plurality of processing and data centers as needed to implement the features of the system. Also, while the processing and data center 101 is shown as a centralized unit in FIG. 1, the functions of the processing and data center 101 may be distributed among a plurality of nodes (not shown) connected by a network as desired by implementers of the system 100.

Each caregiver using a caregiver terminal such as 106 or 107 is interested in improving and monitoring the wellbeing of at least one call recipient, such as a senior or other cared-for individual for whom the caregiver is responsible. Each call recipient has a call recipient station, e.g., 104 or 105, which may consist of a conventional telephone. Wireless telephones, video telephones, Internet-access telephones, camera phones, voice-over-Internet-protocol (VOIP) telephones and other such telephones may be used as call recipient stations for enabling communication between the processing and data center 101 and each call recipient.

According to one implementation of the system 100, a caregiver may initially create a user account using a caregiver terminal, e.g., 106 or 107, by accessing the processing and data center 101, for example, via a website generated by the processing and data center 101. The caregiver may select a service to be provided, such as a basic inspiration and monitoring package, a language in which the calls and communications are to be conducted (English, Spanish, French, Chinese, etc.), as well as additional options, such as a photo/letter option, a dialog option, and/or a message center option. The caregiver may enter payment information for the selected services, select and be assigned a user identification and password, and receive a confirmation email confirming the details of the services selected and the caregiver's account information.

After creating an account, using a caregiver terminal such as 106 or 107, the caregiver may log in to the processing and data center 101, for example, via a website generated by the processing and data center 101, to set up a calling program for one or more call recipients (for example, seniors or other cared-for persons). The setup process may require the caregiver to input, for example, the name, address, and phone number(s) of a desired call recipient (including subsequent phone numbers to be tried if the call recipient does not answer the phone at a first phone number dialed); a theme for the calls to be received by the call recipient (such as inspirational, entertainment, spiritual, etc.); optional information concerning photo/letter options, dialog, options, message options, etc.; a desired call schedule (for example, daily or weekly calls at a selected time of day); a desired report schedule and method of delivery (for example, by email, website or mail); alert behaviors (for example, behaviors for which the caregiver should receive an automated or manually generated alert email message or phone call), reminder behaviors (for example, reminders to the call recipient to take medications or reminders to the caregiver of special occasions, such as the call recipient's birthday); and any secondary caregivers or emergency contacts for the call recipient. The processing and data center 101 will subsequently generate a test communication (for example, phone call or email) to the caregiver and a test call to the call recipient station, e.g., 104 or 105, via telephone server 103. Once the test call has been successfully completed, the processing and data center 101 will begin to make calls to the call recipient in accordance with the preferences entered by the caregiver.

In addition to the enrollment process performed by a caregiver as described above, call recipients may also create a user account and select a call program via the Internet or via telephone, wherein the call recipient provides information and makes selections concerning his/her user account and call plan using voice recognition technology, touch tone responses, or other suitable ways of entering information needed to create a user account and define a call plan by telephone.

Other entities, such as healthcare organizations, may also enroll their subscribers or customers as call recipients, using, for example, a website provided by the system 100.

Each call to a call recipient received at a call recipient station, e.g., 104 or 105, may consist of a number of prerecorded audio segments played in a pre-selected sequence to the call recipient. Some of the audio segments comprise questions that illicit a response from the call recipient. The questions may be closed-ended questions (in which a small number of responses are requested, such as "yes" or "no"), which may be recognized using voice recognition technology, provided to processing and data center 101 via telephony server 103. The questions may also be open-ended questions in which the call recipient is asked to describe or discuss a topic or record a message. The call recipient's response is recorded by the telephony server 103 and stored in processing and data center 101. Each call may comprise one or more open-ended and/or closed-ended questions seeking a verbal response from the call recipient. Data representing the call recipient's verbal responses, as well as other data concerning the call (for example, the number of rings before the call recipient answers the phone, time of call, audio segments played, etc.) are stored by the processing and data center 101.

The stored data from the calls may be used to generate reports to one or more caregivers, modify the timing, structure and/or content of future calls made to the call recipient, and/or generate alert messages to a caregiver or other emergency contact. The stored data may further be used to analyze the status of health and wellbeing of the call recipient. Further details of the operation of the multichannel content personalization system 100 are provided below.

Figure 2:
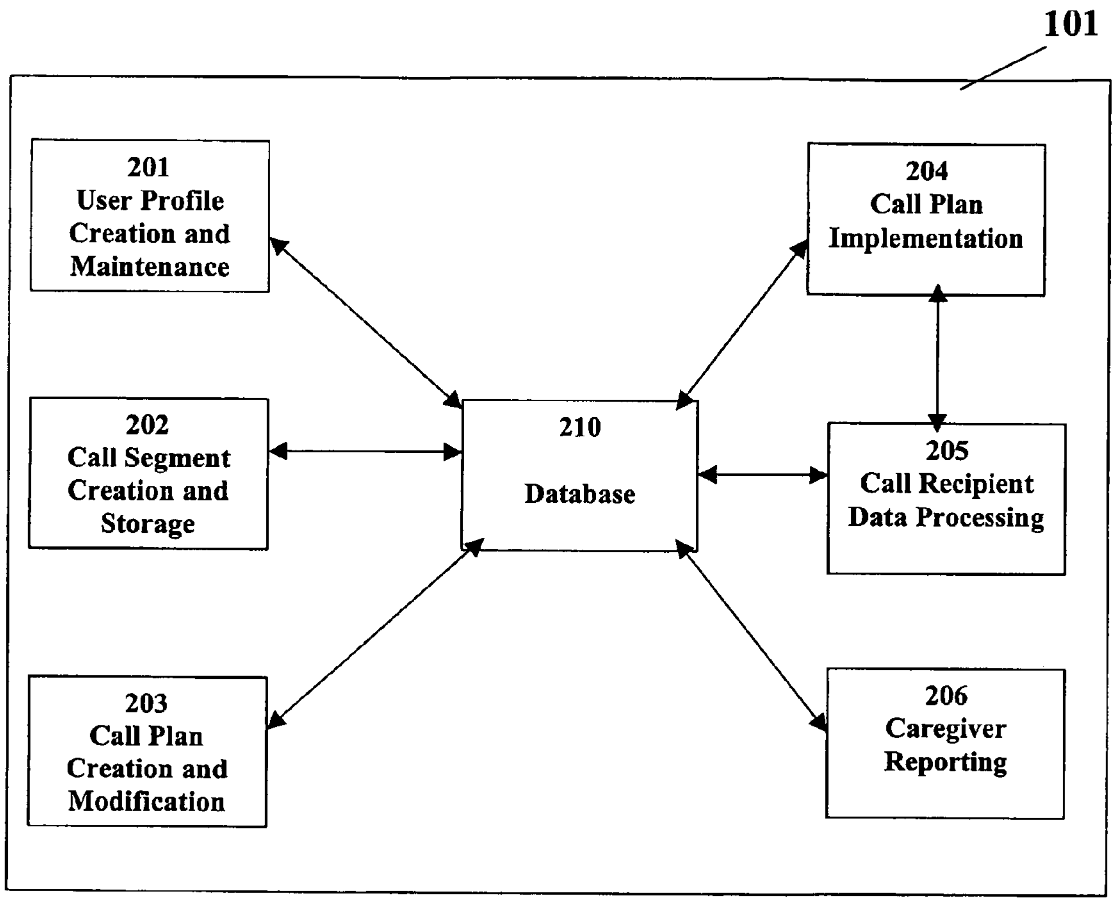
FIG. 2 provides a diagram of a processing and data center for use in the multichannel content personalization system of FIG. 1.

FIG. 2 provides a diagram of a processing and data center 101 for use in the communication system 100. The center 101 shown in FIG. 2 includes a user profile creation and maintenance component 201, a call segment management component 202, a call plan creation and modification component 203, a call plan implementation component 204, a call recipient data processing component 205, a caregiver reporting component 206, and one or more databases represented by database 210, as may be needed to store the data needed for operation of the system 100. Each component 201-206 may be implemented, for example, as a software application, component of a software application, combination of software applications, or combination of hardware and software applications as desired by the implementers of the system 100.

A user profile creation and maintenance component 201 for use in system 100 may include an application that generates a website to enable caregivers to enter caregiver data and call recipient data by creating an account and enter call recipient set-up information as described above with reference to FIG. 1. The caregiver is able to listen to and select from a number of prerecorded call segments, such as inspirational, entertaining, and/or spiritual prerecorded call segments to be played to the call recipient. The caregiver is also prompted to enter a schedule for the calls to be made to the call recipient. Based upon the information and preferences selected by the caregiver, collected by the user profile creation and maintenance component 201 and stored in database 210, the call plan creation and modification component 203 creates a call plan and schedule for each call recipient as described below in further detail. An exemplary listing of data fields that may be used to create a user profile, such as a profile for a call recipient and associated caregiver, is provided in Appendix A, attached hereto.

In addition to choosing a call program for their call recipient(s), caregivers may be given the option of sending letters and photographs. If a caregiver selects this option, the website generated by user profile creation and maintenance component 201 prompts the caregiver to create a letter online and to submit photos electronically. The caregiver may be given the option of editing the photos before submitting them. Once the letter and photos are submitted by the caregiver electronically, then they may be formatted into a printed document by the communication system, and sent via mail to the call recipient.

The caregiver may also optionally elect to have automated or manually generated alert messages (for example, by email, telephone, pager or text message) sent to them or to another emergency contact when certain conditions occur. For example, the caregiver may request that an alert message be sent when the call recipient gives a certain answer to a certain question (e.g., in response to the question "Do you need help?" or "Are you in pain?" the call recipient says "Yes.") Also, if the call recipient fails to answer the telephone after a certain number of attempted calls, provides an unexpected answer to a question, or participates inconsistently in the calls, the caregiver may elect to receive an alert message.

Each alert message sent by telephone may include, for example, a prerecorded audio message into which the call recipient's name is inserted. Alert messages may also be sent via electronic text, such as in an email, text message, or pager message.

The caregiver may also optionally elect to record messages, such as greetings or reminders by any member family or other user of the system, to be provided to the call recipient as part of the call plan. If the caregiver selects this option, the caregiver may record one or more voice messages, for example, by using a microphone (not shown) attached to their caregiver terminal (e.g., 106 or 107) or by calling a certain phone number provided by the caregiver website, entering a PIN, and recording the desired message(s). The caregiver may then manage the recordings using the caregiver website provided by the user profile creation and maintenance component 201 to select and schedule the messages that will be played to the call recipient.

Caregivers may also optionally sign up to listen to audio programs via the Internet, such as inspirational or instructional programs to assist and support the caregivers and receive email reminders of the time and digital link for the audio programs.

In an embodiment of the present invention in which a healthcare organization provides the calling and monitoring service to its subscribers, the healthcare organization may also record, select and schedule messages to be provided in calls to its subscribers.

The user profile creation and maintenance component 201 may also enable call recipients to create their own user accounts and call plans, for example, by enabling the call recipients to set up their user accounts and call plans via a website (as described above with respect to caregivers) or via a telephone call. Telephone registration and enrollment may be provided, for example, by a live, automated voice recognition, or automated touchtone telephone system provided by user profile creation and maintenance component 201 that enables call recipients to call a phone number and provide information and selections in response to questions, thereby creating a user account and a call plan.

A call segment management component 202 for use in the system 100 provides for organization and classification of a plurality of prerecorded call segments that comprise the prerecorded audio segment data used to build each call to each call recipient. For example, the system 100 may offer three different initial greeting segments, fifty program segments (e.g., inspirational, educational, spiritual, etc.), two different transitional segments (providing a spoken transition between the program and the health dialogue), fifteen different health dialogue segments, twenty different question segments, and three different closing segments that are available to be combined in different combinations to generate calls to a call recipient:

Call Segments Available:

Greeting 1, Greeting 2, Greeting 3

Program 1, Program 2, . . . Program 50

Transition 1, Transition 2

Health Dialogue 1, Health Dialogue 2, . . . Health Dialogue 15

Question 1, Question 2, . . . Question 20

Closing 1, Closing 2, Closing 3

The call segment management component 202 receives prerecorded voice segments from an external source (not shown) and stores them in database 210 along with classification data to identify the type of segment (e.g., greeting, program, transition, etc.) as well as various characteristics of the segment, such as the tone of the segment (enthusiastic, motivational, soothing, etc.), the nature of the contents of the segment (inspirational, historical, entertainment, religious, etc.), and a description or transcript of the contents of the segment. The segments and accompanying classification data are used by call plan creation and management component 203 to create a call plan for each call recipient. Prerecorded voice segments may be provided in various speaking tones, speaking styles, moods, languages, etc., as desired by the caregivers, call recipients, and other users of the system 100.

Call segments for use in the calls to call recipients may be specifically designed to target specific populations with educational programs and desired behavior. A target population may be identified and a desired effect or goal defined. Health dialogues may be scripted to achieve the desired effect or goal. For example, some segments may be designed for listening by the general population, while other programs may be specifically targeted to call recipients based upon information such as characteristics of the call recipients or the call recipients' prior responses to questions. Health topics may include, for example, wellness segments such as diet, exercise, mental stimulation, and/or medical topics, such as chronic disease support for conditions like diabetes, chronic heart failure, asthma, etc. Additionally, music segments may be provided to affect the mood of the call recipient or the call recipient's receptiveness to listening to the call.

A call plan creation and modification component 203 for use in system 100 enables either automatic or manual creation of call plan data for each call recipient in which the combination of prerecorded audio segments to be played and the variation within each category of segments is defined. Call plan creation and modification component 203 further tracks the segments that have been played to each call recipient as well as segments to be played in the future and in what order. For example, using the sample categories described above, call plan data for a call recipient may include:

| Segment | Order | Played | To Be Played |
|---|---|---|---|
| Greeting | Sequential | 1, 2 | 3 |
| Program | Random | 2, 16 | 1, 3-15, 17-50 |
| Transition | Sequential | 1, 2 | Start series again |
| Health Dialogue | 1-10, Sequential | 1, 2 | 3-10 |
| Question | 1-10, Sequential | 1, 2 | 3-10 |
| Question | 11-20, Random | 13, 12 | 11, 14-20 |
| Closing | Sequential | 1, 2 | 3 |

Thus, each call defined as provided above will have a sequence including a greeting, a program, a transition, a health dialogue, two questions, and a closing. Each of the three prerecorded greeting, transition and closing segments will be rotated in sequential order and repeat after all three segments have been played. The fifty program segments will be randomly rotated and repeated in random order after all fifty have been played. Ten of the available fifteen health dialogue segments will be played in sequential order and repeated after all have been played. The first ten question segments will be rotated sequentially and repeated after all ten have been played, and the second ten question segments will be rotated randomly and repeated in random order after all ten have been played.

So, the first call previously made to the call recipient included:

Greeting 1, Program 2, Transition 1, Health Dialogue 1, Question 1, Question 13, Closing 1

The next call previously made to the call recipient included:

Greeting 2, Program 16, Transition 2, Health Dialogue 2, Question 2, Question 12, Closing 2

The next call to be made to the call recipient will include:

Greeting 3, Program 41 (randomly selected), Transition 1, Health Dialogue 3, Question 3, Question 18 (randomly selected), Closing 3.

Thus, call plan creation and modification component 203 creates a call plan and a scheduled sequence for each prerecorded segment type for calls to a given call recipient.

The call plan creation and modification component 203 may further create call plans in which the segments to be played to the call recipient are selected based upon the responses spoken by the call recipient, for example, in response to questions posed to the call recipient during the call. Call plan creation and modification component 203 may create a call plan in which a question segment is played, a response is collected by call recipient data processing component 205 (described in detail below), and the next segment played to the call recipient is selected based upon the contents of the call recipient's response. For example, if a call recipient is played a question segment asking whether the call recipient would like to record a message to be sent to his or her caregiver, a "yes" response received from the call recipient may prompt a segment to be played to ask the user to record the message. A "no" response from the call recipient will prompt a different segment to be played to the call recipient. Thus, call plans created by the call plan creation and modification component 203 may include various options for segments to be played if an appropriate response is received from the call recipient during the call.

Specific program and other segments may also be designed and scheduled to be played to the call recipient on a specific date, for example, a New Year's greeting or other specific holiday greeting, a birthday greeting, a historical news report, or other segment having specific date significance. Also, messages recorded by a caregiver may be played on certain dates, for example, to remind a call recipient to attend an appointment or take a certain medication.

Additional segment types may include audio entertainment, educational materials, health surveys, timely reminders, motivational programs, and instant connections to family and/or friends in which a call recipient to be transferred to a caregiver by telephone call by speaking the caregiver's name or selecting the caregiver's name from a list. For example, "call caregiver Mary" spoken by the call recipient would prompt the system to look up Mary's phone number, call Mary, and connect Mary to the call recipient.

The call plan creation and modification component 203 may further revise the call plan data for a given call recipient based upon the responses received from the call recipient in response to questions. For example, component 203 may generate a score for the call recipient based upon previous responses by the call recipient to questions on a selected topic. In this embodiment, each question segment stored by call segment management component 202 may be categorized by topic and each potential answer to the question is assigned a score value. Call plan creation and modification component 203 reviews the answers given by a call recipient in response to questions on a given topic and calculates a score for that topic over a defined period of time. Based upon the score, the call plan creation and modification component 203 may vary the question segments to be presented to the call recipient in future calls.

For example, topic scores may be used to assess the call recipient's comprehension or retention of the information provided in the call segments. A score indicating that the call recipient did not understand or retain the information may result in repetition of the call segment to the call recipient in the next call, or a change in the tone in which the information is provided (for example, moving from a gentler tone to a firmer or more motivational tone). A score indicating a high level of comprehension or retention by the call recipient may result in acceleration of related call segments in the call plan for the call recipient or expanded versions of call segments on the topic with additional information or details concerning the topic.

The topic score may further be used to modify Talking Points™ provided to the caregiver as discussed in detail below with reference to caregiver reporting component 206.

The call plan creation and modification component 203 further provides a call monitoring function that enables selection or revision of the call plan data for a given call recipient based upon information input by the caregiver(s) for the call recipient. For example, the caregiver may enter subject matter preferences expressed by the call recipient through his/her caregiver terminal (e.g., 106 or 107), which will be used by call plan creation and modification component 203 to revise the segments to be played to the call recipient in the future. The use of feedback provided by the call recipient and the caregiver enables the call plan creation and modification component 203 to tailor the call plan for each call recipient to provide a better listening experience for the call recipient and to enable the caregiver to obtain desired information about the call recipient.

Call recipients may be provided with opportunities to alter their call plan data, for example, by providing verbal responses during a call or by providing feedback in the form of mail responses to letters seeking feedback from the call recipient. The call recipients' preferences are entered into the call recipient data processing component 205 and used to modify the call plans designed for the call recipient by call plan creation and modification component 203. For example, if a call recipient indicates that she prefers religious programs instead of historical programs, this information will be collected by or input into call recipient data processing component 205 and provided to call plan creation and modification component 203 to change the program segments to be provided to the call recipient in the future. If the call recipient wants only one health question in each call instead of two questions, this preference can be implemented by call plan creation and modification component 203 to reflect the preferences of the call recipient. In this way, call recipients may alter the contents of their programs, the call time or phone number, the method of answer entry (for example, entering answers by touch tone instead of speech), the level of privacy, the type of health programs delivered to them, etc. Similar feedback may be collected from caregivers, for example, via caregiver terminals (e.g., 106 or 107) or via mail, and similarly implemented to modify the call plan for a given call recipient.

A call plan implementation component 204 for use in system 100 obtains the call plan from call plan creation and modification component 203 and retrieves the prerecorded segments from the database 210 to be included in the call to the call recipient. The prerecorded segments may be, for example, stored and retrieved in WAV audio file format, or in any other desired format. Call plan implementation component 204 assembles the segments retrieved from database 210 and provides the segments in the order set by the call plan from call plan creation and modification component 203 to telephony server 103 (see FIG. 1). Telephony server 103 receives the segments from call plan implementation component 204 and generates a telephone call with the segments provided to designated a call recipient station (e.g., 104 or 105 in FIG. 1). After the call is made, the call plan creation and modification component 203 updates its tracking table (shown above) to indicate which segments have been played to the call recipient and which segments are yet to be played. Also, at the end of each call, the call recipient may be asked to verify the time and day on which he or she would like to receive the next call.

A call recipient data processing component 205 for use in system 100 monitors the call status during each call and collects various types of response data from the call recipient during each call made to a call recipient station (e.g. 103 or 104) by the processing and data center 101 via telephony server 103. For example, the call recipient data processing component 205 may collect data concerning the logistics of each call made, such as data indicating the date and time at which each call is placed, the phone number called, the duration of each call, the number of rings before a call recipient answers the telephone, the number of times a call is attempted before a call recipient answers the telephone, whether the call is answered by a human or a machine, whether the call recipient hangs up before completion of each call, whether the call recipient or the telephony server 103 hangs up at the completion of each call, and the audio segments and messages played to the call recipient during each call. The call recipient data processing component 205 may further collect data provided by the spoken voice of the call recipient, such as answers to questions posed to the call recipient during each call. Spoken answers to closed-ended questions may be recognized using voice recognition technology and stored as written text data, while spoken answers to open-ended questions in which no specific answer is required may be recorded, for example, in a WAV audio file format, by component 205. All data collected by call recipient data processing component 205 is stored in database 210.

The call plan creation and revision component 203, call plan implementation component 204 and call recipient data processing component 205 function together during each call made to a call recipient station to insure a seamless call. While some segments of each call do not solicit input from the call recipient, other segments, in particular question segments, prompt the call recipient to provide a response. The next segment played to the call recipient may be varied based upon the response provided by the call recipient. Therefore, as the call recipient data processing component 205 collects response data from a call recipient, this call data may be provided to call plan implementation component 204 to vary the next segment to be provided to the call recipient by telephony server 103.

For example, a call recipient may be prompted to record a message to be provided to his or her caregiver. In one of the question segments of the call, a call recipient may be asked whether he or she would like to record a message to his or her caregiver. The answer to this closed-ended question is received and recognized using voice recognition technology ("yes" or "no"). If the call recipient says "yes," the next segment provided to the call recipient may ask the call recipient to provide the name of the caregiver to whom the message should be sent. This information may also be recognized using voice recognition technology. Next, the call plan will provide a prompt to record the message for the caregiver by speaking into the telephone. If the call recipient says "no" and does not wish to record a message to a caregiver, the call plan will dictate what segment is to be played to the call recipient next.

A caregiver reporting component 206 for use in system 100 enables caregivers to access status data about their call recipient(s), including information about the calls made to the call recipients (e.g., time of call, contents of call) and the call recipient's responses to questions. Caregiver reporting component 206 may be implemented, for example, as a website that is accessed by caregivers via caregiver terminals (such as 106 and 107). Caregivers may log in to the website to access status data about their respective call recipient(s), such as details of answers given by call recipients to closed-ended questions (recorded as text using voice recognition technology), recordings of answers given to open-ended questions, alert messages generated as a result of responses given by the call recipient, messages recorded by the call recipient for the caregiver, and the contents of the programs and health dialogues played for the call recipient in each call. By reviewing the contents of the programs played to the call recipients, the caregiver learns what the call recipient has heard and may use this information as a talking point for conversations with the call recipients to enhance the caregiver's relationship with the call recipient.

Caregiver reporting component 206 may further generate email messages to the caregiver when a call recipient has recorded a message for the caregiver (the email may include a link to the website for accessing the message) or when an alert situation has occurred as defined by the caregiver in setting up the call recipient's account (described above with reference to user profile creation and maintenance component 201). Alerts may also be provided to the caregiver, for example, when a call recipient fails to answer the telephone, provides an unexpected response to a question, participates inconsistently in the calls, or explicitly requests a callback by the call recipient.

Caregivers may also select access to web streamed audio programs to provide information and/or support for the caregiver in caring for his or her call recipient. Caregivers may further sign up for automated email reminders of audio programs that they have selected.

In accordance with one embodiment of the multichannel content personalization system 101, caregiver reporting component 206 generates a website including a "dashboard" of information on the status of each call recipient that may be accessed by one or more caregivers. This dashboard of information may provide, for example, an overview of the programs most recently heard by the call recipient, answers to questions given by the call recipient, status of interactions with the call recipient, and Talking Points™ that present a timely overview of the information that has been presented to the call recipient and suggested topics for caregivers to discuss with the call recipients (a sort of "teacher's edition" for each audio program presented to call recipients, which may be adapted based upon the topic scores generated by call plan creation and modification component 203 discussed above). The information provided by the dashboard display or any subset thereof may also be provided by email to the caregiver on a periodic (e.g., daily or weekly) basis. The caregiver reporting component 206 thus enables communication between the caregiver and one or more call recipients that is greatly enhanced due to the caregiver's use of the information provided on the website to understand the issues and information presented to the call recipients.

Caregiver reporting component 206 may also be implemented to enable access to information about call recipients and/or caregivers by other entities, such as healthcare organizations. For example, the caregiver reporting component 206 may generate reports summarizing call recipients' answers to various health-related questions. Such users of the system may further select topics to be presented in audio segments to the call recipients, provide prerecorded program segments to be provided to call recipients, and provide questions to be posed to the call recipients. In this way, a healthcare organization or other entity may provide valuable information to a large group of call recipients through information programs and obtain feedback and data from the call recipients on desired issues, such as healthcare issues. This process of providing information to call recipients, posing questions to the call recipients, and obtaining response data from the call recipients can enable an entity such as a healthcare organization to implement a meaningful dialogue with call recipients on healthcare and other desired topics. Similarly, entities that sponsor implementation of the system 100 may provide prerecorded segments, such as promotional messages and advertisements, to be played to all or selected call recipients.

Figure 3:
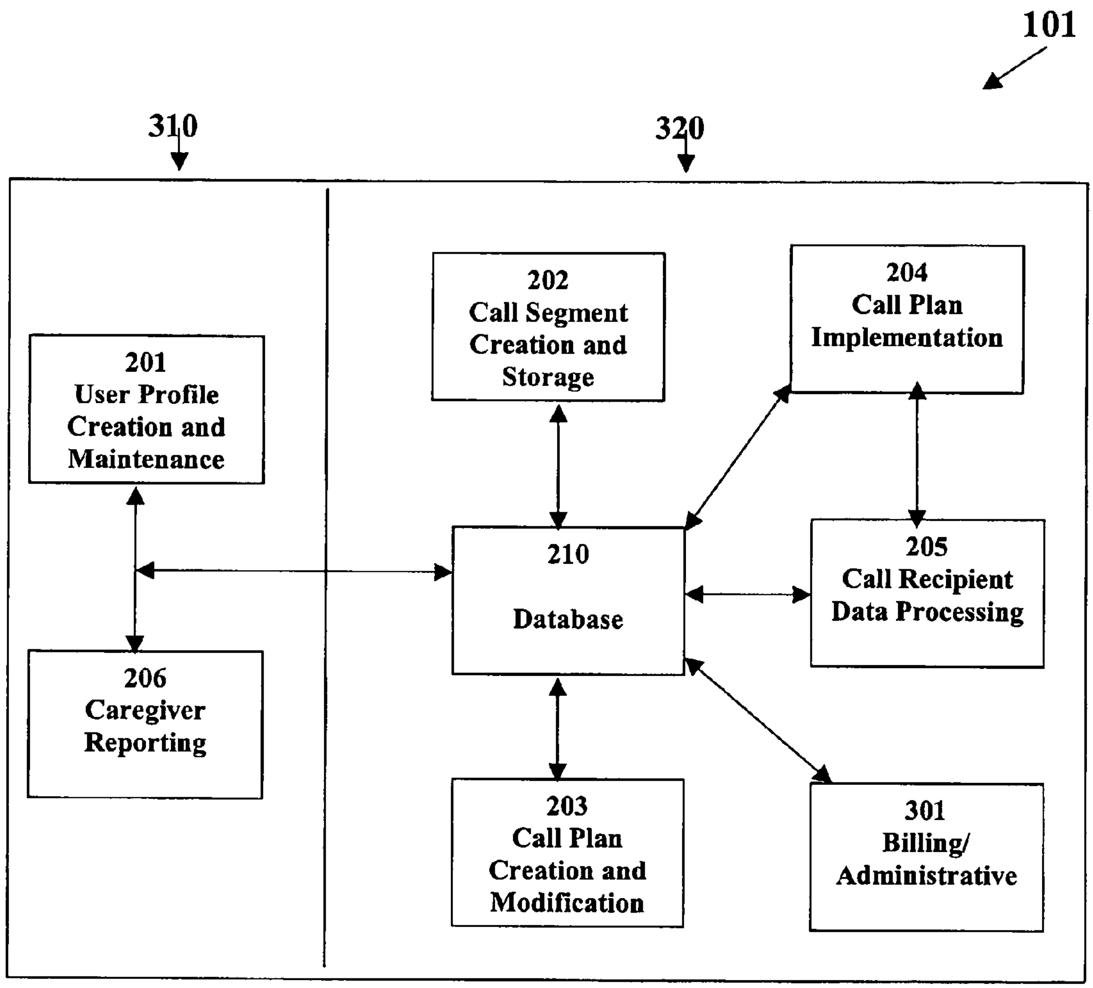
FIG. 3 provides a diagram of an alternative processing and data center for use in the multichannel content personalization system of FIG. 1.

As shown in FIG. 3, an alternative implementation of a processing and data center 101 of FIG. 1 includes two zones, a zone 310 for public access, such as access by the caregiver terminals 106 and 107, and a secure zone 320 accessible by the implementers of the multichannel content personalization system 100. The public access zone 310 may include a firewall to provide secure access to caregivers, for example, using password security, and include user profile creation and maintenance component 201 and caregiver reporting component 206. The secure zone 320 may be implemented, for example, using a virtual private network (VPN), and include call segment creation and classification component 202, call plan creation and modification component 203, call plan implementation component 204, call recipient data processing component 204, and one or more databases represented by database 210. The secure zone 320 may further include a billing and administrative component 301 that provides financial functionality, customer service functionality, privacy reporting functionality (for example, as required by HIPAA), and other administrative functionality as desired by the system implementers.

FIG. 4 provides a chart of an exemplary call plan created by call plan creation and modification component 203 (shown in FIG. 2). In FIG. 4, the "call flow" column provides the flow of segments played to the call recipient during this call. The "spoken information" column provides some information about the text of each segment in the call. The "segment ID" column provides a numerical identification number for each segment played during the call. The "voice talent" column identifies the speaker that recorded the segment. The "program column" describes general characteristics of each segment played. The "segment" column provides the segment types that were played to the call recipient during the call.

Figure 5:
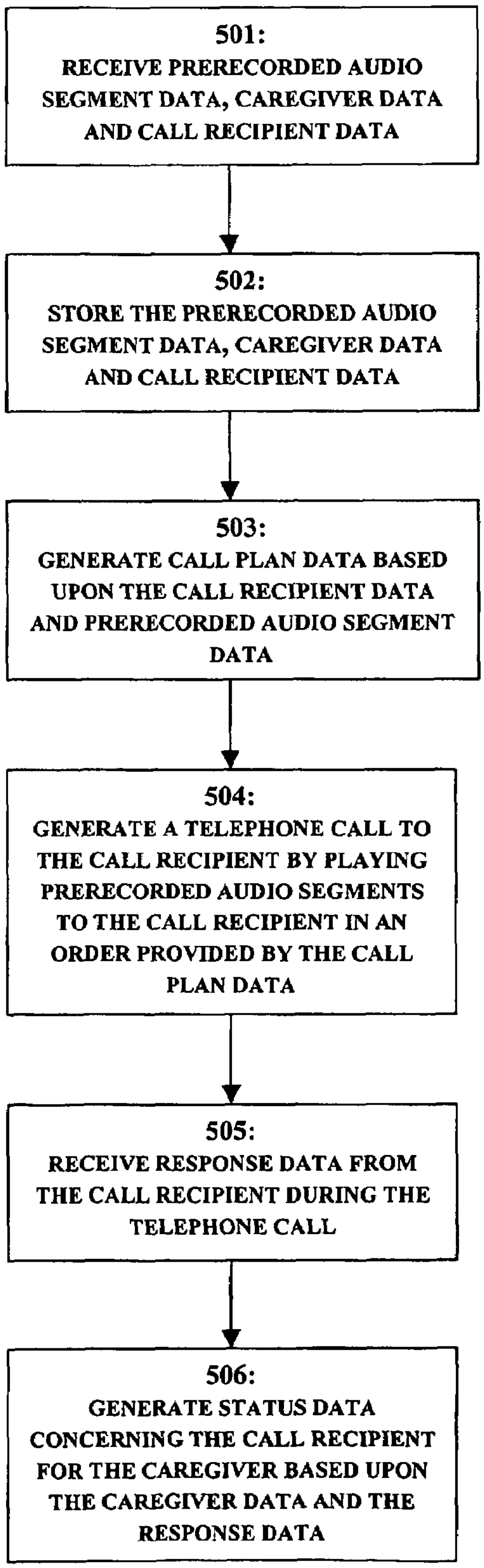
FIG. 5 provides a diagram of a method for providing multichannel content personalization.

FIG. 5 provides a functional block diagram of a method for multichannel content personalization in accordance with the present invention. The method of FIG. 5 includes the following steps.

Step 501: receiving prerecorded audio segment data, caregiver data and call recipient data. This step may be performed, for example by user profile creation and maintenance component 201 and call segment creation and storage component 202. Audio segment data includes prerecorded audio segments to be played to the call recipients during a call and is collected and processed by call segment creation and storage component 202. Caregiver data includes data associated with the caregiver, including the caregiver's name and contact information, payment information, reporting and alert preferences, etc. Call recipient data includes data associated with the call recipient, including the call recipient's name and contact information, program selections and preferences, responses to past questions, etc.

Step 502: storing the prerecorded audio segment data, caregiver data and call recipient data. The data is stored, for example, in database 210.

Step 503: generating call plan data based upon the caregiver data, call recipient data and prerecorded audio segment data. This step may be performed, for example, by call plan creation and modification component 203. The call plan data may be modified based upon changes made by the caregiver to the caregiver data or call recipient data and/or based upon the response data provided by the call recipient.

Step 504: generating a telephone call to the call recipient by playing prerecorded audio segments to the call recipient in an order provided by the call plan data. This step may be performed, for example, by call plan implementation component 204.

Step 505: receiving response data from the call recipient during the telephone call. This step may be performed, for example, by call recipient data processing component 205. The response data may be a spoken message provided by the call recipient during the telephone call or a touch tone or other non-verbal response. When the response data is spoken data, the method may further include the step of translating and storing the spoken message provided by the call recipient in a text format using voice recognition technology and/or storing the spoken message provided by the call recipient in a digital audio format. The response data may also include information about the call, such as data indicating the date and time at which each call is placed, the duration of each call, the number of rings before a call recipient answers the telephone, the number of times a call is attempted before a call recipient answers the telephone, and the audio segments and messages played to the call recipient during each call.

Step 506: generating status data concerning the call recipient for the caregiver based upon the response data. This step may be performed, for example, by caregiver reporting component 206. Status data includes data collected by the system 100 and provided or made available to the caregiver to enable the caregiver to monitor and gather information about the call recipient and calls made to the call recipient.

The method may further include the steps of playing an audio message recorded by the caregiver to the call recipient during the telephone call; providing an audio message recorded by the call recipient during the telephone call to the caregiver; and/or transmitting an alert message to the caregiver based upon the call recipient data, the caregiver data and the response data received from the call recipient during the telephone call.

FIGS. 6-20 provide illustrations of web-based screen formats that may be implemented in the integrated system and method according to the present invention.

Figure 6:
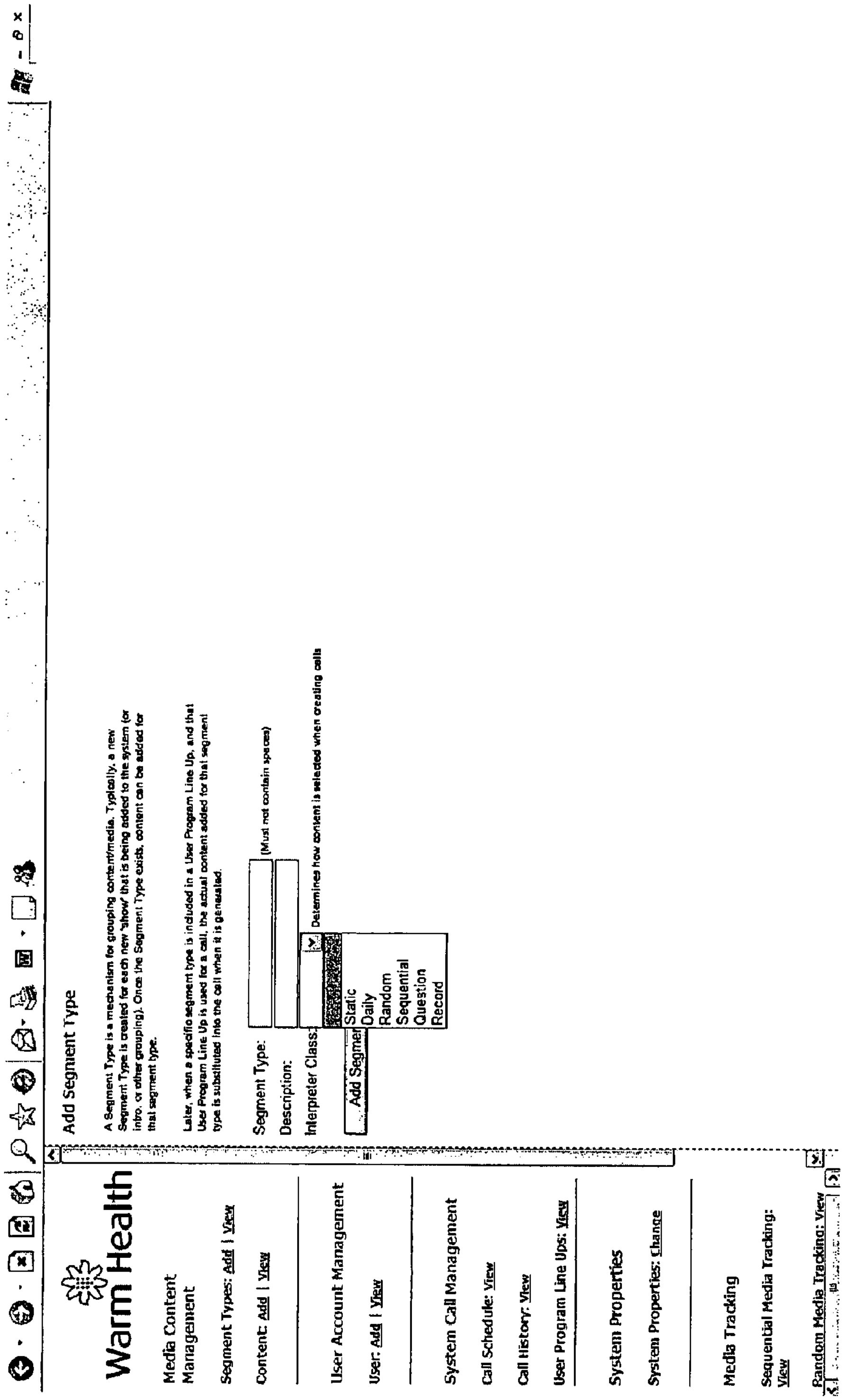
FIGS. 6-20 provide diagrams of computer data accessing and entry screens for use in defining and modifying call recipient setup information in the multichannel content personalization of FIG. 1.
Figure 7:
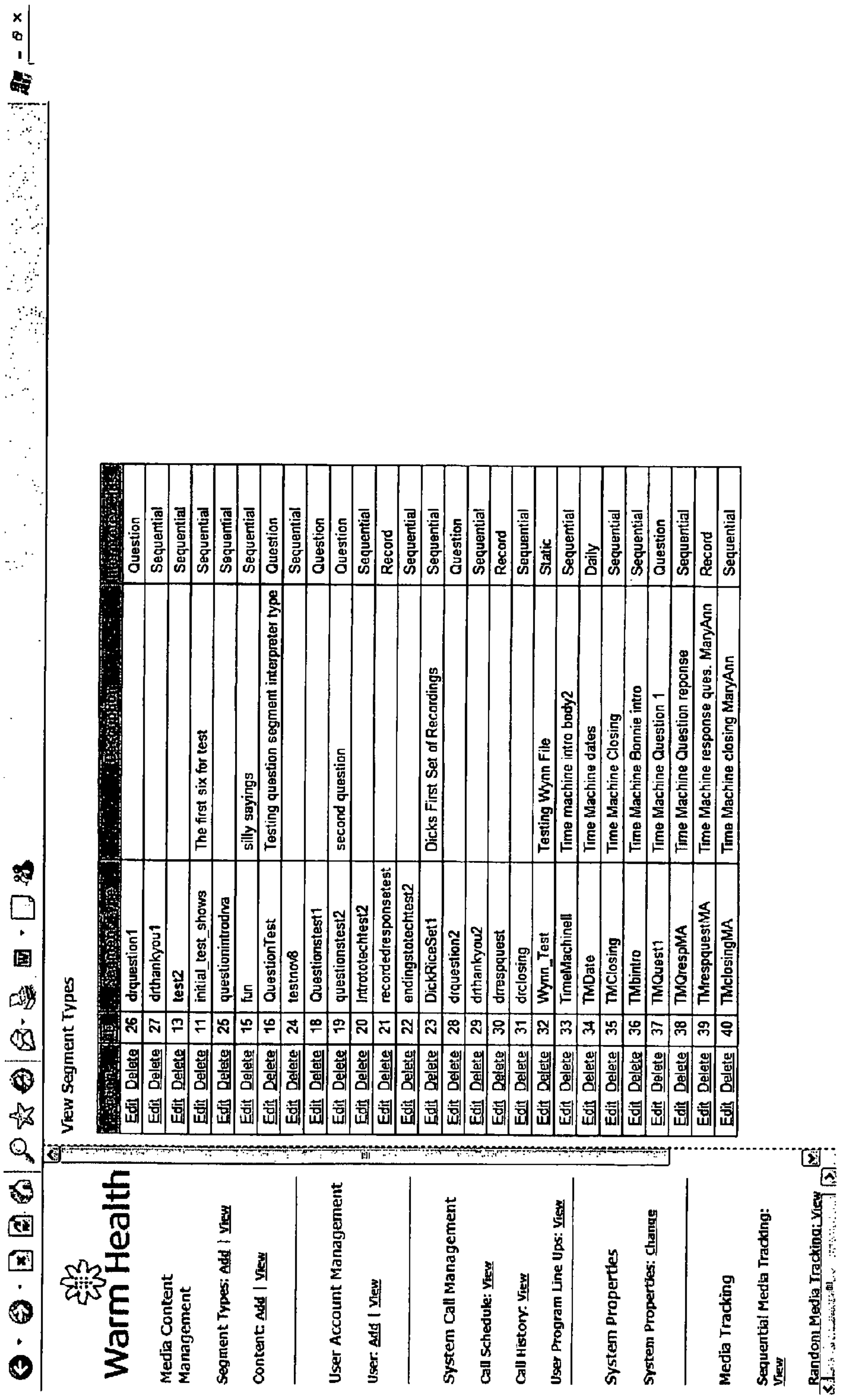
Figure 8:
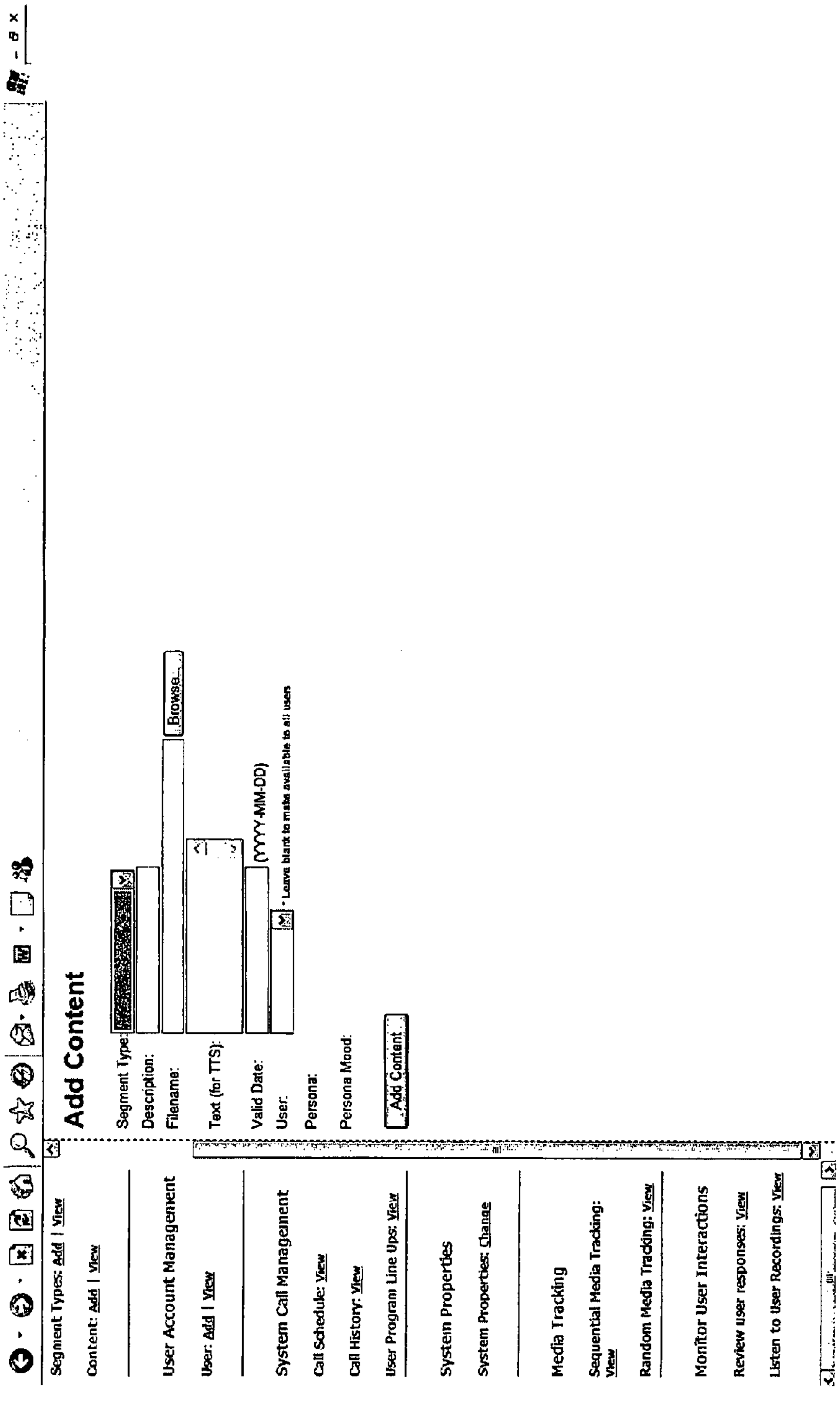
Figure 9:
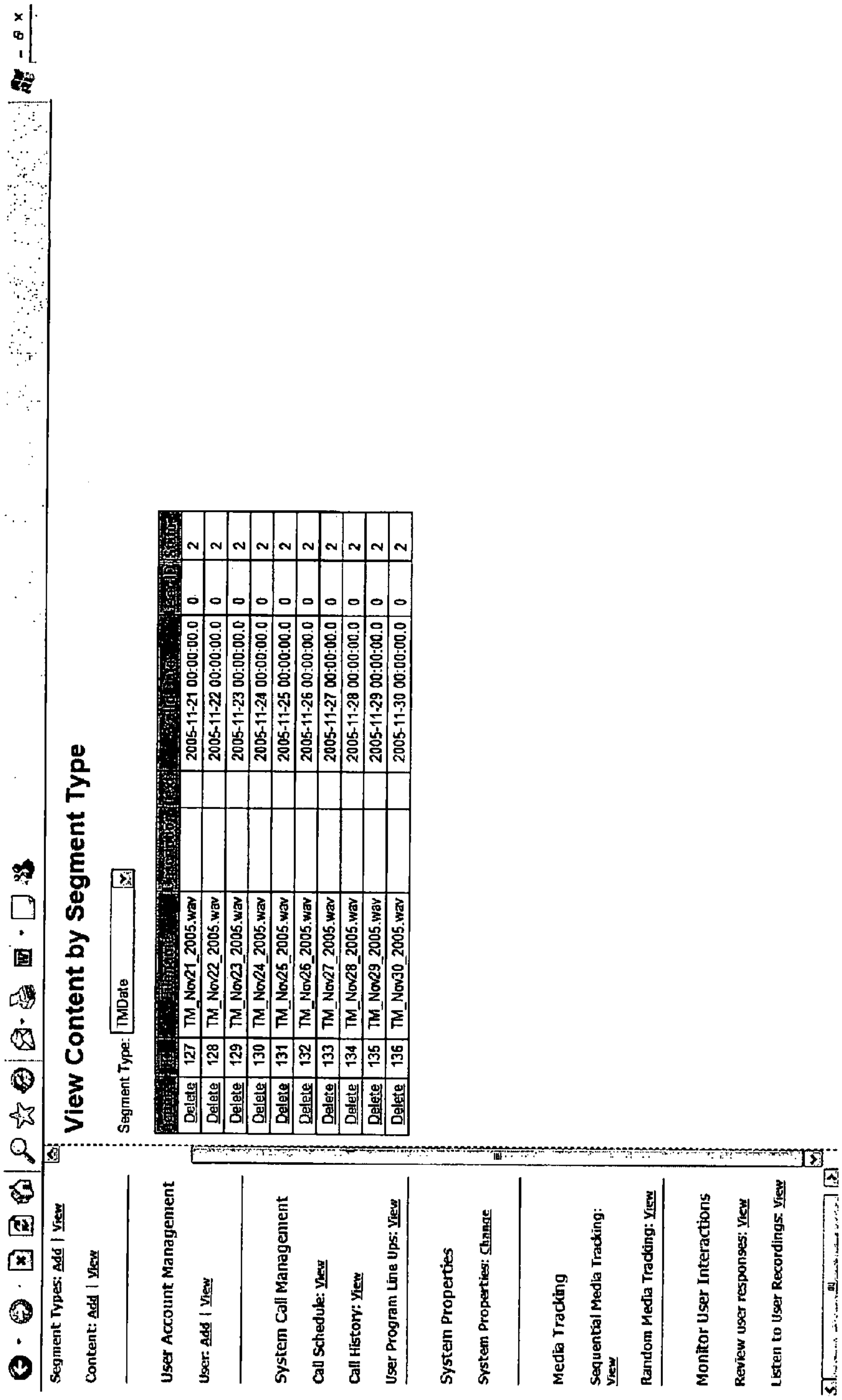
Figure 10:
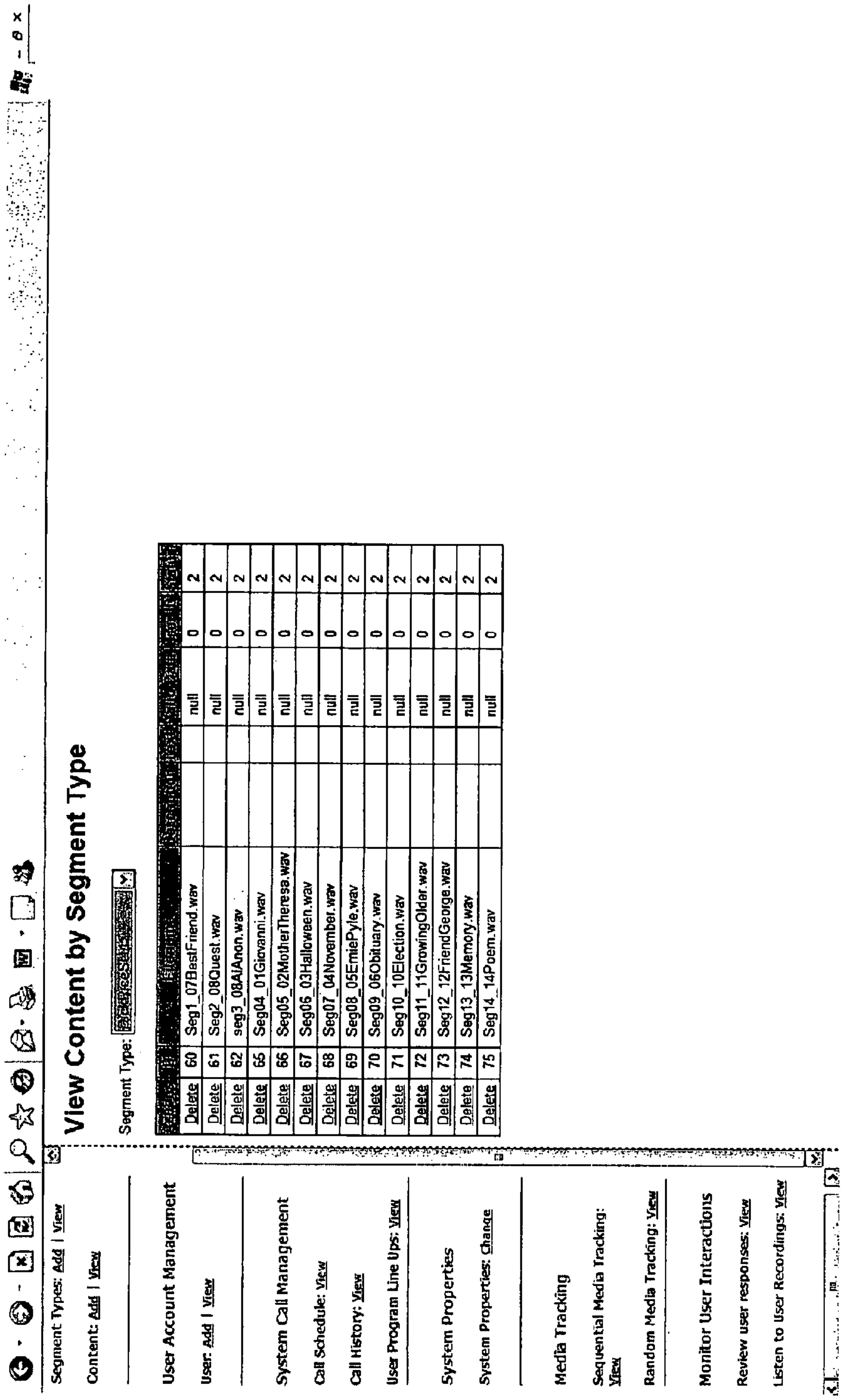

FIGS. 6-10 illustrate the addition of new segment types and segment contents as provided by the call segment and creation component 202 of processing and data center 101. In FIG. 6, a segment type may be added. FIG. 7 provides a view of segment types. In FIG. 8, new segment contents for a particular segment type may be added. FIGS. 9 and 10 provide views of content segments by segment type. In FIG. 9, all different content segments for the segment type "TMDate" are shown. In FIG. 10, all different content segments for the segment type "DickRiceSet1" are shown.

FIGS. 11-20 illustrate various aspects of creating and modifying call plans for call recipients, tracking calls made to a call recipient, and response data obtained from call recipients.

Figure 11:
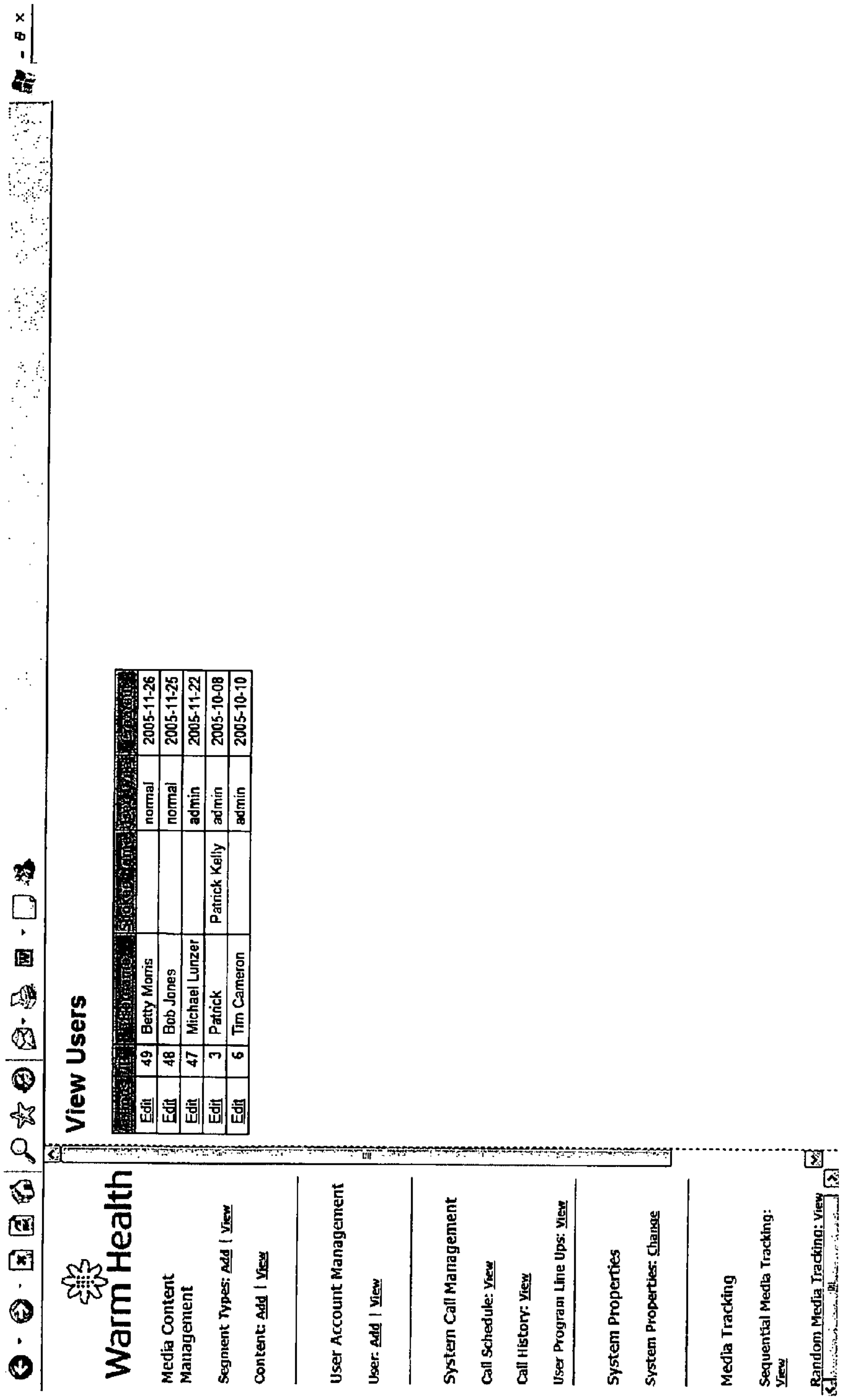

FIG. 11 provides a screen showing a list of existing call recipients.

Figure 12:
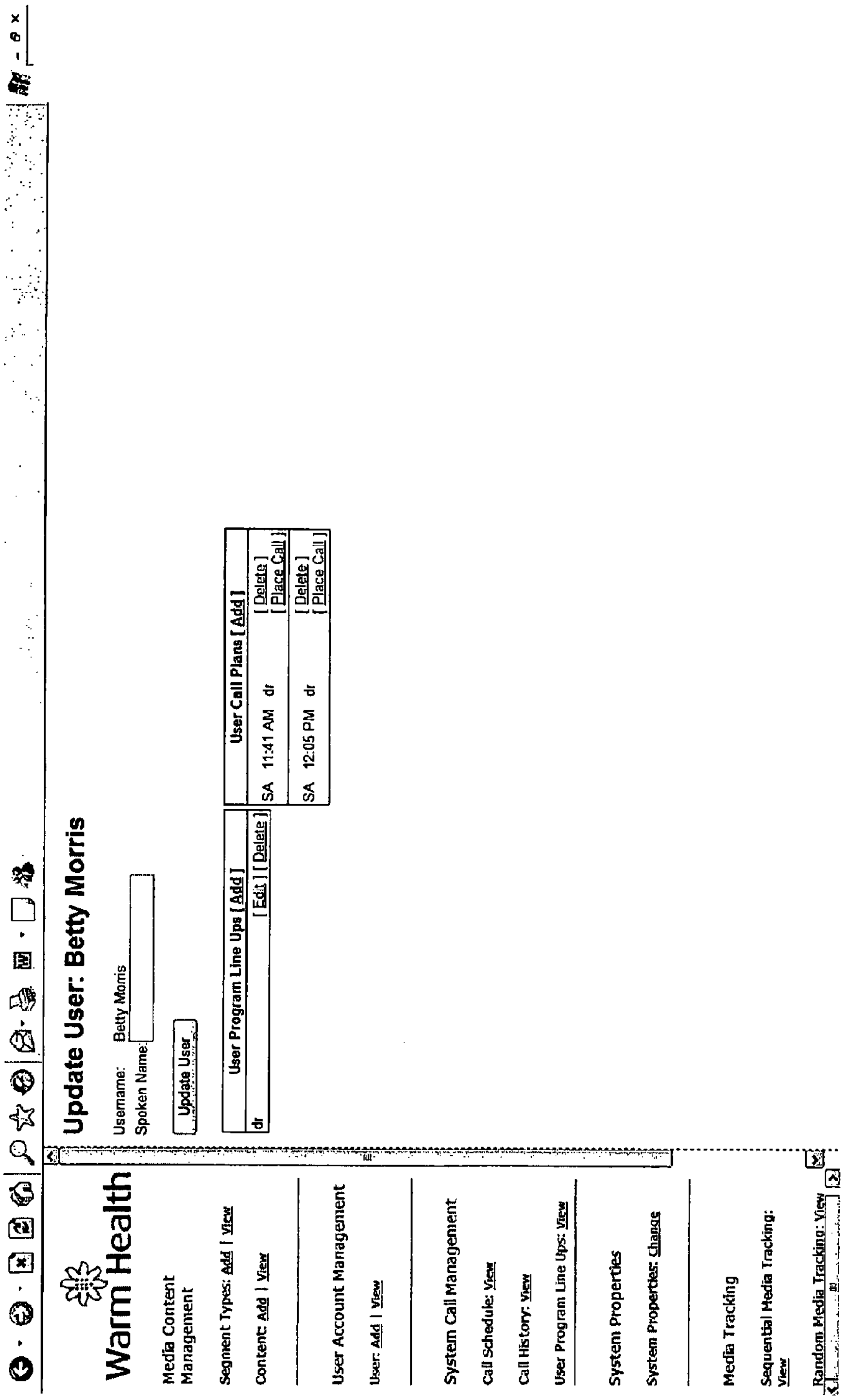

FIG. 12 provides a screen to enable modification or updating of a call plan for a specific call recipient "Betty Morris," including updating of the call plan format and the call schedule for this call recipient.

Figure 13:
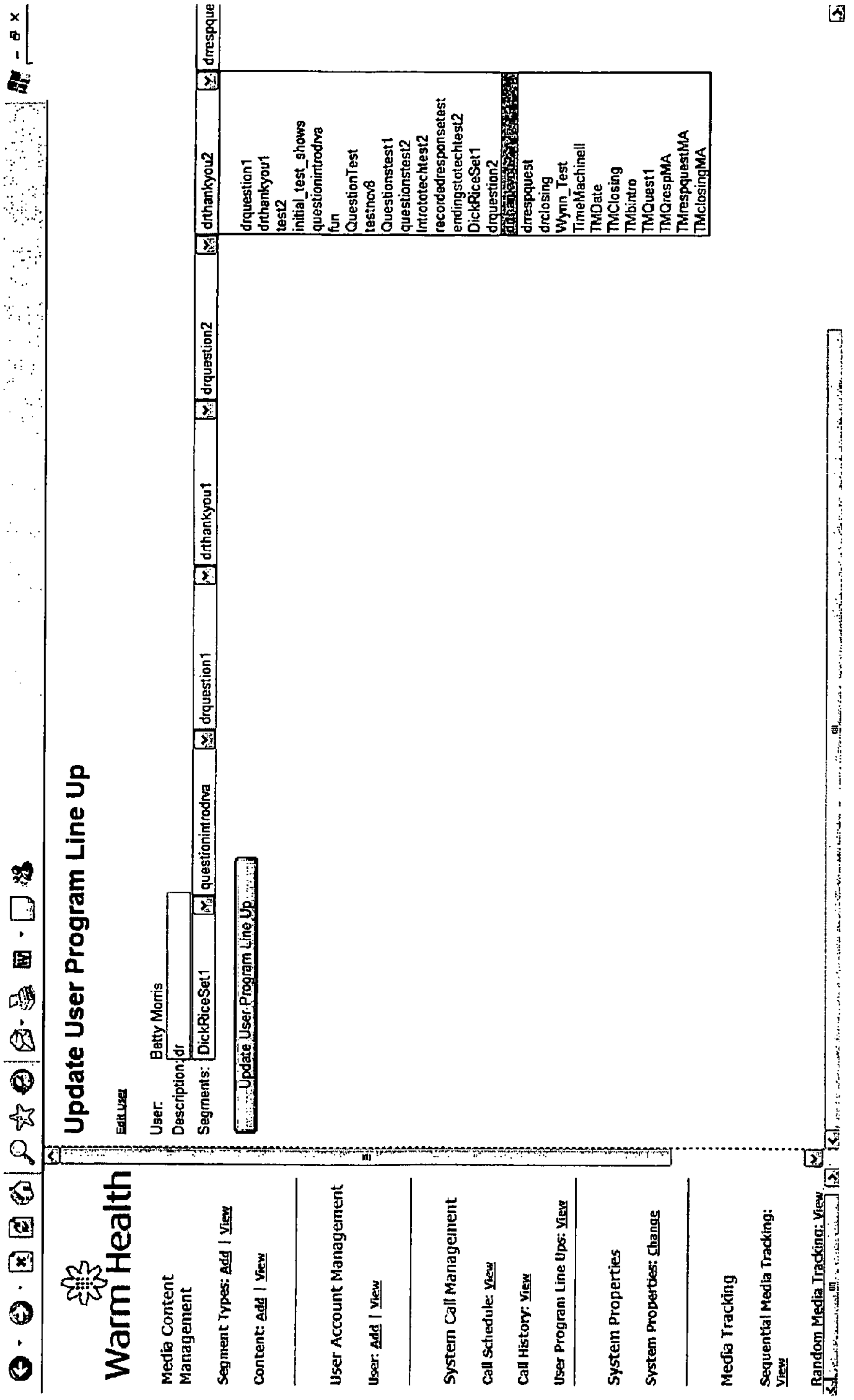

FIG. 13 provides a view of the segments included in the call plan for call recipient Betty Morris, including a program "DickRiceSet1," a segment for introducing questions "questionintrodrva," a first question "drquestion1," a thank you segment "drthankyou1," a second question "drquestion2," and second thank you segment "drthankyou2," and a response request segment "drrespreuest." Additional segments may also be added to this call plan and existing segments may be modified as shown by the pull-down menu under the segment "drthankyou2."

Figure 14:
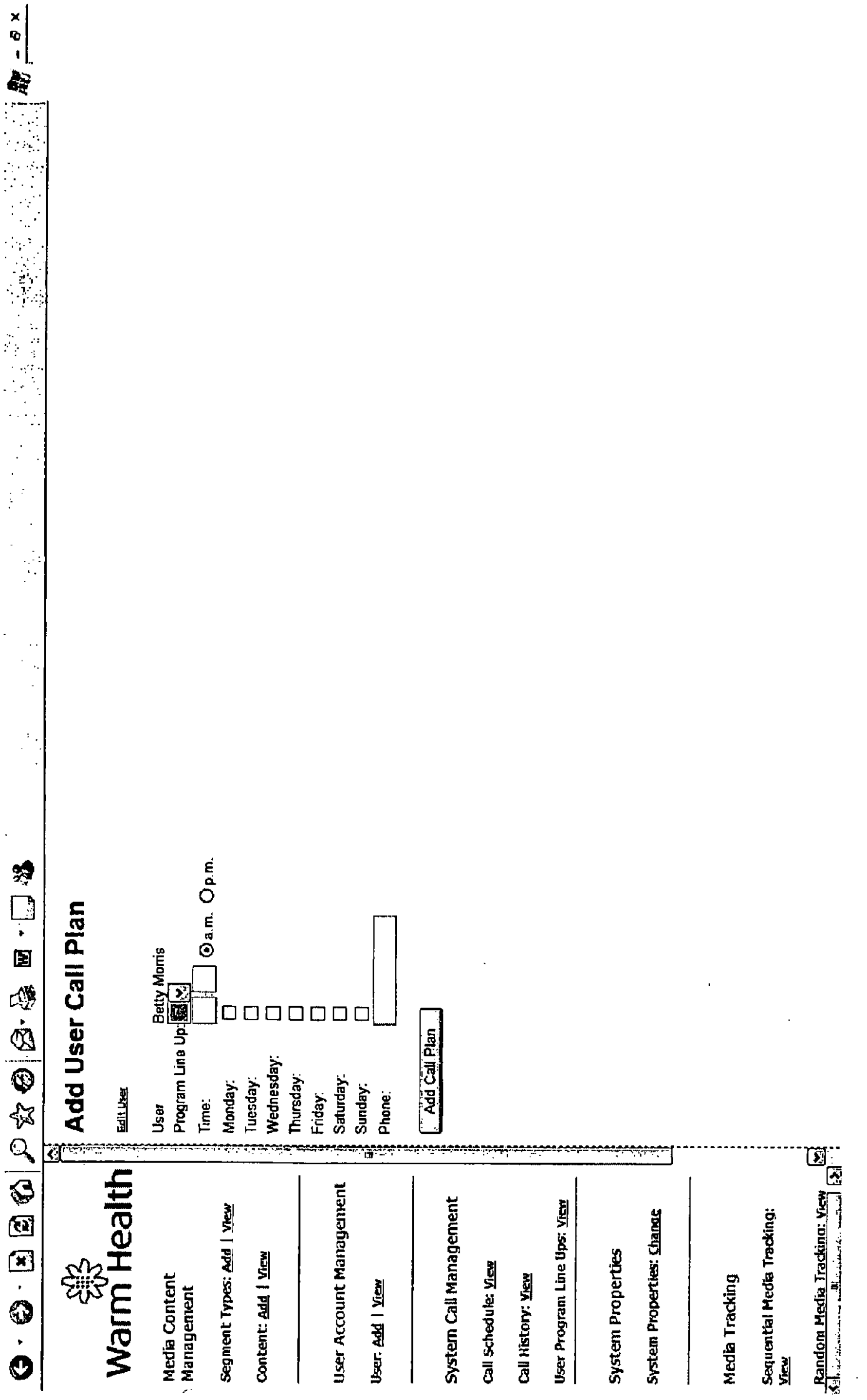

FIG. 14 illustrates a screen enabling a user, such as a system administrator or caregiver, to add a call plan for a call recipient, including selection of a program lineup and a time and schedule for the calls.

Figure 15:
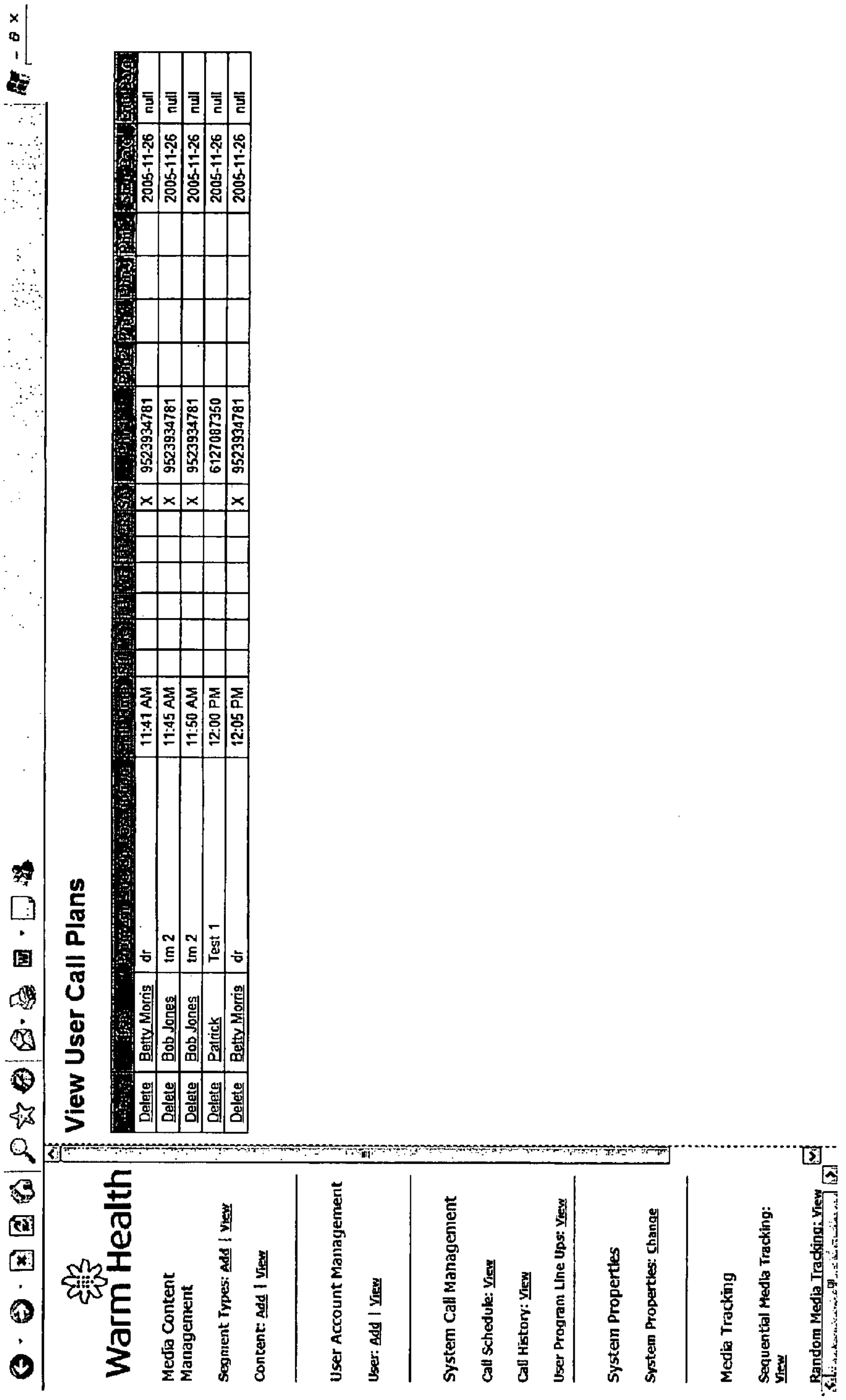

FIG. 15 provides a view of all existing call recipient call plans, including call times, phone numbers and call plan start dates.

Figure 16:
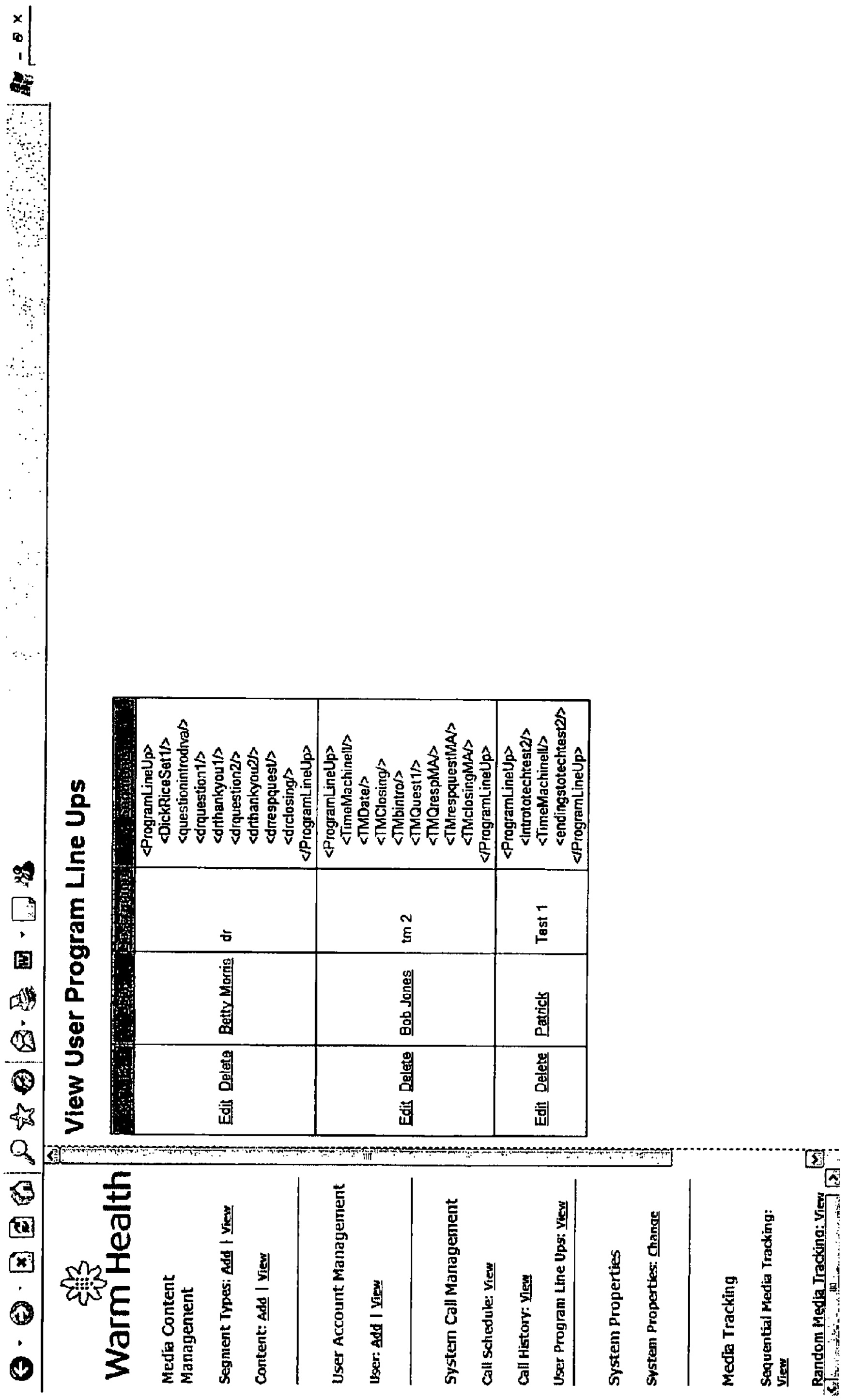

FIG. 16 provides a summary of the call plan for each of three call recipients.

Figure 17:
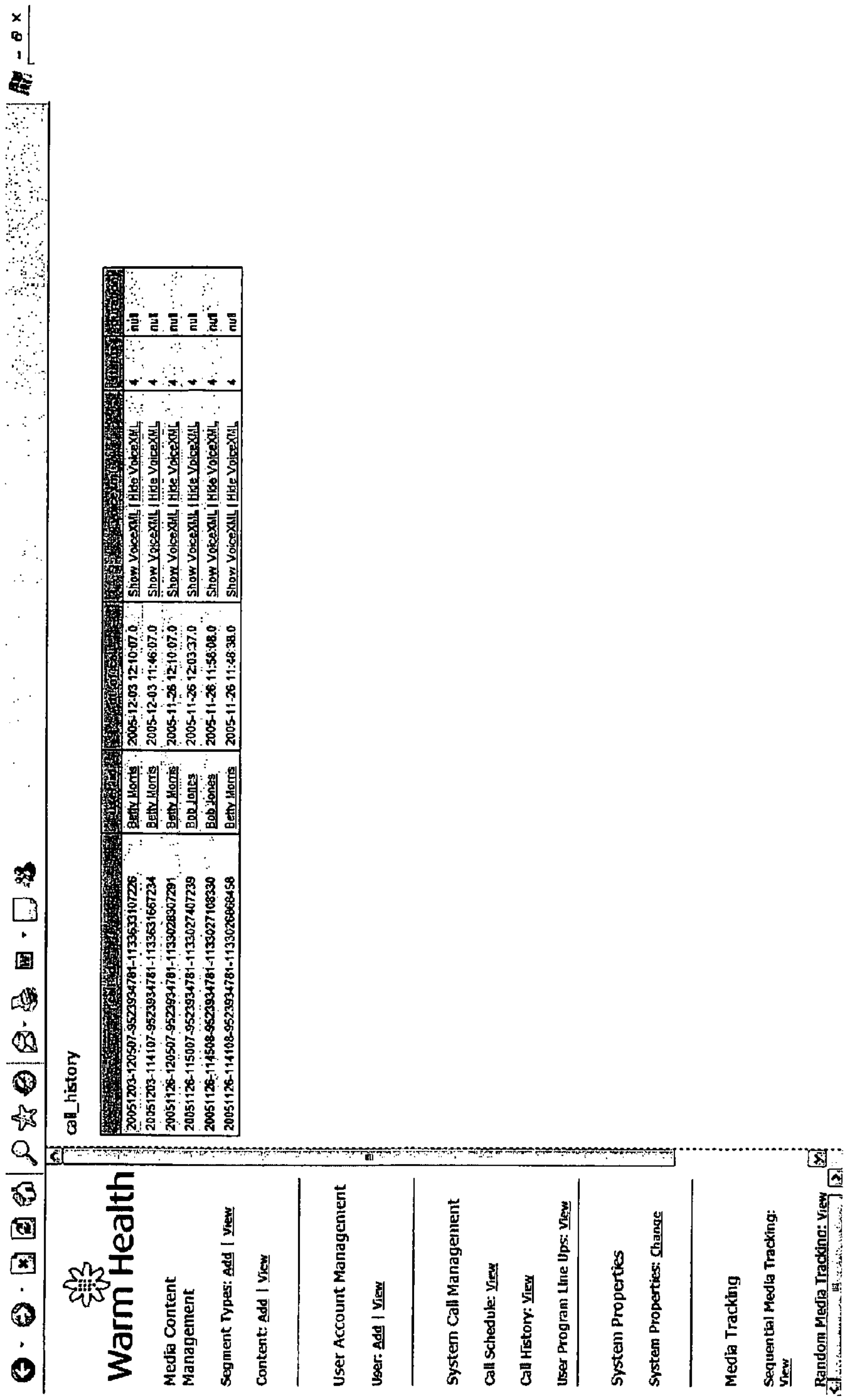

FIG. 17 provides a call history of calls made to call recipients "Betty Morris" and "Bob Jones."

Figure 18:
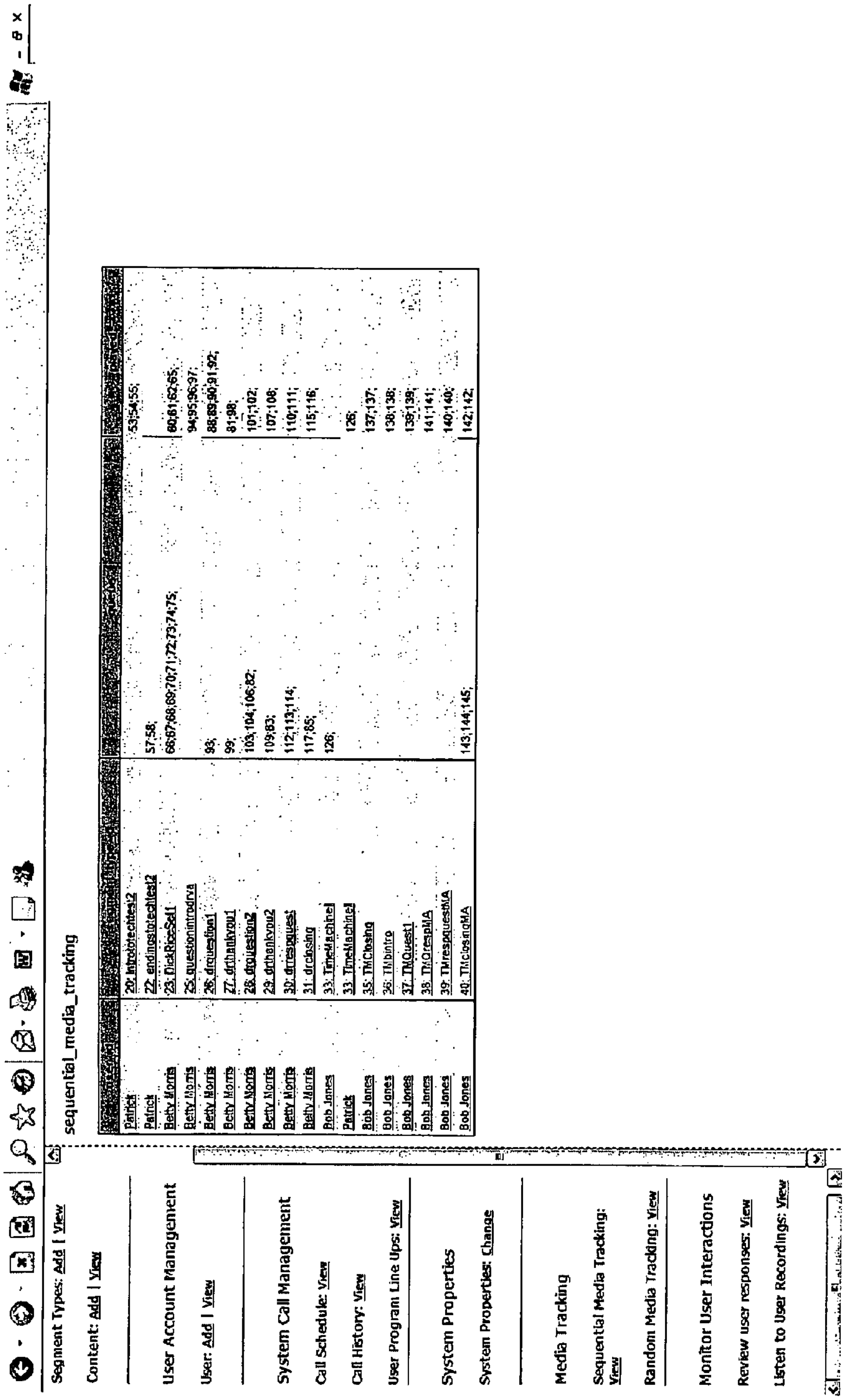

FIG. 18 provides an illustration of a tracking table in which segments previously played and segments to be played to call recipients is tracked. Additional detail concerning segment tracking is provided above with reference to call plan creation and modification component 203.

Figure 19:
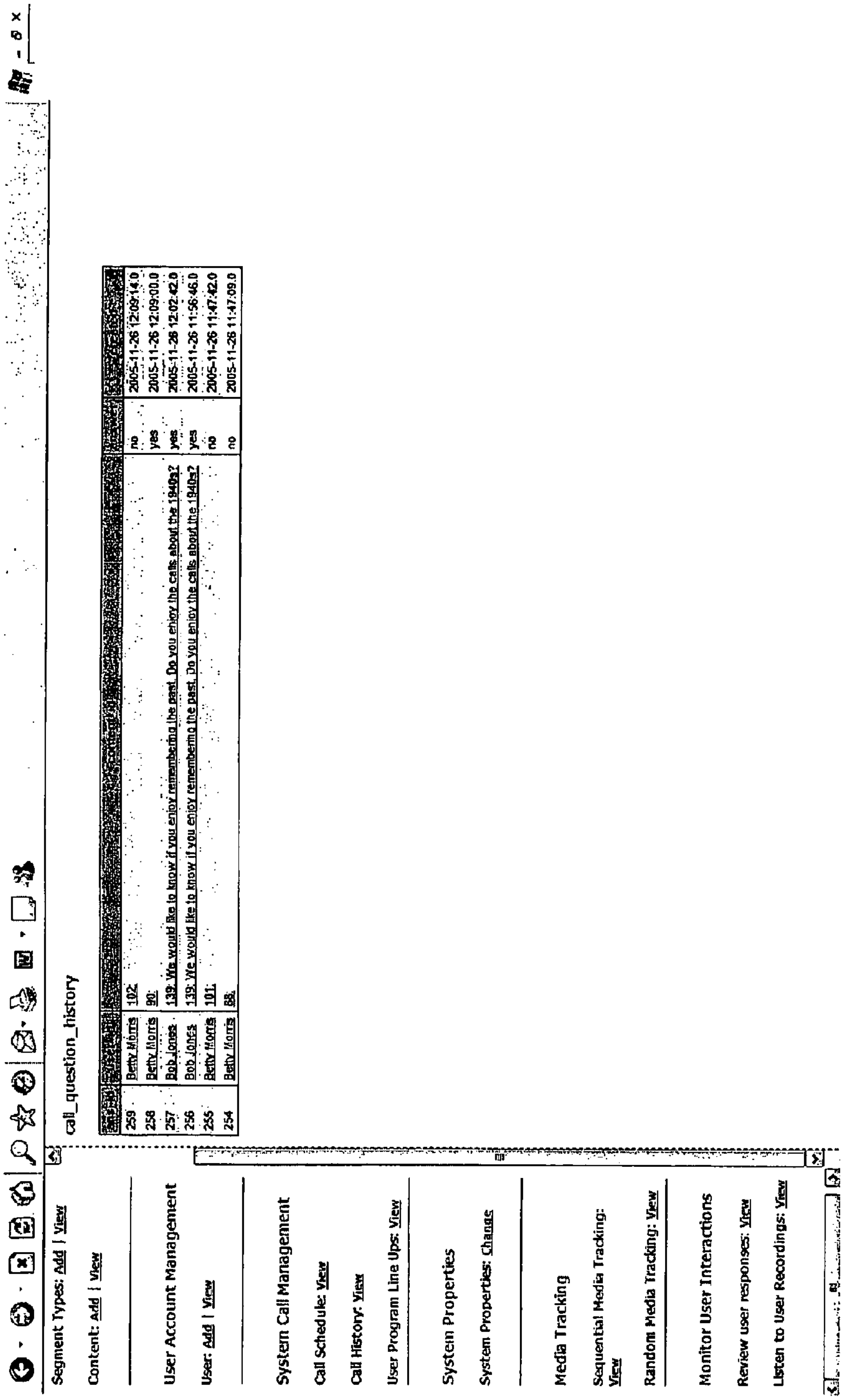

FIG. 19 provides a summary of the answers to questions provided by a call recipient that have been recognized using voice recognition technology and stored as text data. This may include, for example, call recipients' answers to closed ended questions with a small number of possible and predictable responses.

Figure 20:
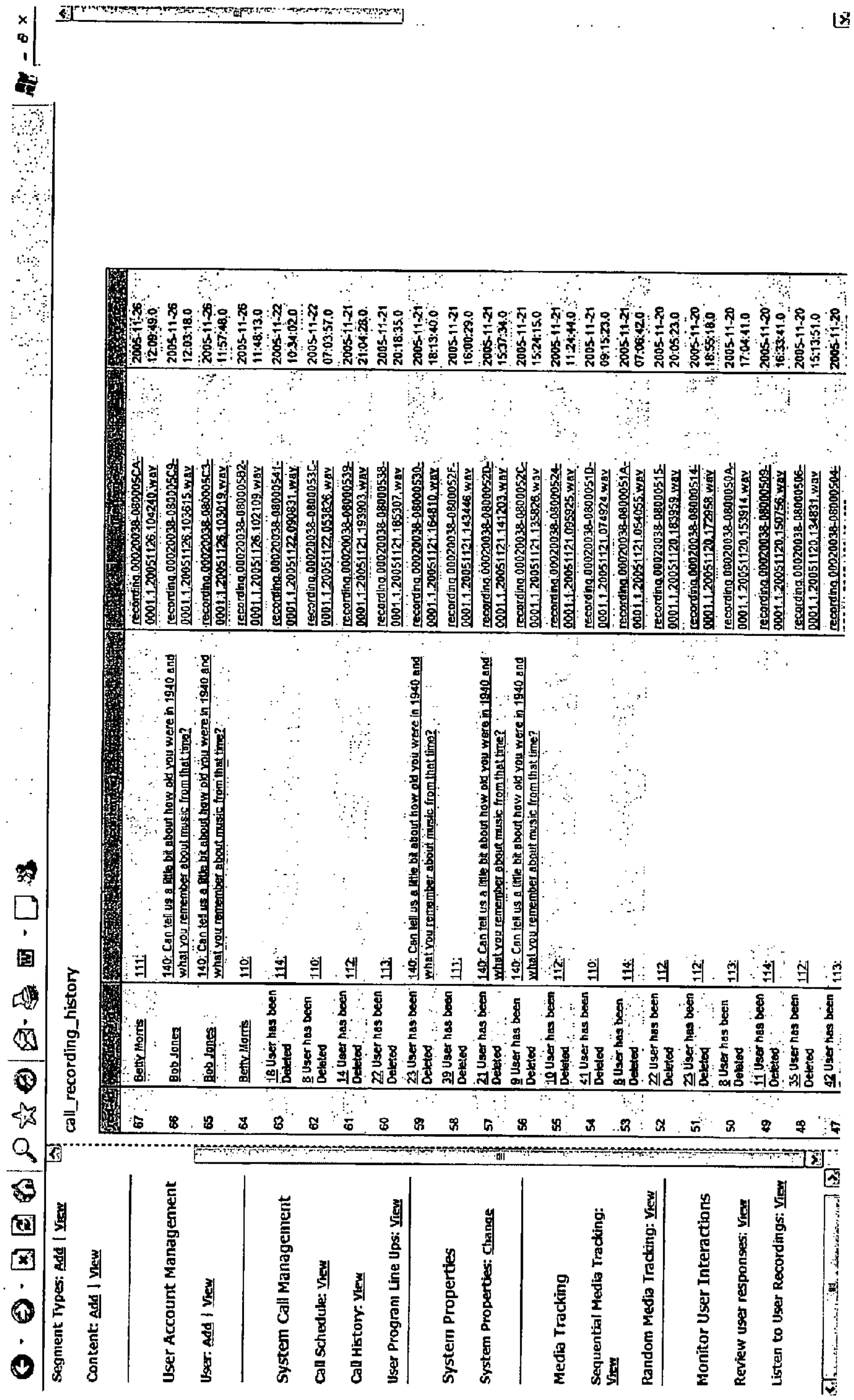

FIG. 20 provides a listing of recorded responses given by call recipients to open-ended questions, which may be recorded and stored as WAV audio files.

The method and system according to the present invention may be implemented using various combinations of software and hardware as would be apparent to those of skill in the art and as desired by the user. The present invention may be implemented in conjunction with a general purpose or dedicated computer system having a processor and memory components.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A multichannel content personalization system for enabling communication between a caregiver and a call recipient, comprising:

a receiver for receiving prerecorded audio segment data, caregiver data and call recipient data, wherein the prerecorded audio segment data includes a plurality of entertainment program segments and health dialogue segments to be played to one or more call recipients and a plurality of question segments seeking response data from the one or more call recipients;

a storage device for storing the prerecorded audio segment data, caregiver data and call recipient data;

a processor for generating call plan data based upon the call recipient data and prerecorded audio segment data, wherein the call plan data determines which of the prerecorded audio segments will be played and the sequence of the prerecorded audio segments in each telephone call to a call recipient, and wherein the call plan data for each call recipient includes at least one entertainment program segment, one health dialogue segment, and one question segment in each telephone call; and a server for generating each telephone call to the call recipient by playing prerecorded audio segments to the call recipient in accordance with the call plan data for the call recipient;

wherein the processor receives the response data from the call recipient during the telephone call and generates status data concerning the call recipient for the caregiver based upon the caregiver data and the response data.

2. A system according to claim 1, wherein the caregiver data and the call recipient data are entered by the caregiver via a caregiver terminal.

3. A system according to claim 1, wherein the response data includes a spoken message provided by the call recipient during the telephone call, and the processor uses voice recognition technology to translate and store the spoken message provided by the call recipient in a text format.

4. A system according to claim 1, wherein the response data includes a spoken message provided by the call recipient during the telephone call, and the processor records and stores the spoken message provided by the call recipient in a digital voice format.

5. A system according to claim 1, wherein the call plan data is modified based upon changes made by the caregiver to the caregiver data or call recipient data.

6. A system according to claim 1, wherein the call plan data is modified based upon the response data provided by the call recipient, wherein the response data includes call recipient preference data that is utilized to determine the prerecorded audio segments to be played in future telephone calls to the call recipient.

7. A system according to claim 1, wherein response data includes a topic score that enables assessment of the call recipient's comprehension of the information provided in the prerecorded call segments played to the call recipient.

8. A system according to claim 1, wherein the call recipient records an audio message during the telephone call to be provided to the caregiver or the caregiver records an audio message to be played to the call recipient during the telephone call.

9. A system according to claim 1, wherein the processor transmits an alert message to the caregiver based upon the call recipient data, the caregiver data and the response data received from the call recipient during the telephone call.

10. A system according to claim 1, wherein the caregiver submits a letter or a photograph to be provided to the call recipient.

11. A system according to claim 1, wherein the telephone call comprises an audio program that is customized to improve the call recipient's receptiveness to the telephone call.

12. A computer-implemented method for enabling communication between a caregiver and a call recipient, comprising one or more electronic components performing the following:

receiving prerecorded audio segment data, caregiver data and call recipient data, wherein the prerecorded audio segment data includes a plurality of entertainment program segments and health dialogue segments to be played to one or more call recipients and a plurality of question segments seeking response data from the one or more call recipients;

storing the prerecorded audio segment data, caregiver data and call recipient data;

generating call plan data based upon the call recipient data and prerecorded audio segment data, wherein the call plan data determines which of the prerecorded audio segments will be played and the sequence of the prerecorded audio segments in each telephone call to a call recipient, and wherein the call plan data for each call recipient includes at least one entertainment program segment, one health dialogue segment, and one question segment in each telephone call;

generating each telephone call to the call recipient by playing prerecorded audio segments to the call recipient in accordance with the call plan data for the call recipient;

receiving the response data from the call recipient during the telephone call; and generating status data concerning the call recipient for the caregiver based upon the caregiver data and the response data.

13. A method according to claim 12, wherein the response data includes a spoken message provided by the call recipient during the telephone call.

14. A method according to claim 13, further comprising the step of translating and storing the spoken message provided by the call recipient in a text format using voice recognition technology.

15. A method according to claim 13, further comprising the step of storing the spoken message provided by the call recipient in a digital voice format.

16. A method according to claim 12, further comprising the step of modifying the call plan data based upon changes made by the caregiver to the caregiver data or call recipient data.

17. A method according to claim 12, further comprising the step of modifying the call plan data based upon the response data provided by the call recipient, wherein the response data includes call recipient preference data that is utilized to determine the prerecorded audio segments to be played in future telephone calls to the call recipient.

18. A method according to claim 12, wherein the response data includes a topic score that enables assessment of the call recipient's comprehension of the information provided in the prerecorded call segments played to the call recipient.

19. A method according to claim 12, further comprising the step of providing an audio message recorded by the call recipient during the telephone call to the caregiver or playing an audio message recorded by the caregiver to the call recipient during the telephone call.

20. A method according to claim 12, further comprising the step of transmitting an alert message to the caregiver based upon the call recipient data, the caregiver data and the response data received from the call recipient during the telephone call.

21. A method according to claim 12, wherein the telephone call comprises an audio program that is customized to improve the call recipient's receptiveness to the telephone call.

22. A multichannel content personalization system for enabling communication between a caregiver and a call recipient, comprising:

a receiver for receiving prerecorded audio segment data, caregiver data and call recipient data;

a storage device for storing the prerecorded audio segment data, caregiver data and call recipient data;

a processor for generating call plan data based upon the call recipient data and the prerecorded audio segment data, wherein the call plan data for each call recipient includes a sequence of categories of prerecorded audio segments to be played to the call recipient and a selection method by which individual prerecorded audio segments in each category are selected for inclusion in each telephone call to the call recipient, and wherein the sequence of categories of prerecorded audio segments in the call plan data for each call recipient includes a greeting, an entertainment program, a health dialogue, a health question, and a closing; and a server for generating each telephone call to the call recipient by playing prerecorded audio segments to the call recipient in accordance with the call plan data for the call recipient;

wherein the processor receives response data from the call recipient during the telephone call and generates status data concerning the call recipient for the caregiver based upon the caregiver data and the response data;

wherein the response data includes call recipient preference data that is utilized by the processor to modify the selection of prerecorded audio segments in future telephone calls to the call recipient, and wherein the prerecorded audio segment selection method may be sequential rotation of the prerecorded audio segments, random selection of the prerecorded audio segments, a combination of sequential rotation and random selection of the prerecorded audio segments, or based upon dates associated with individual prerecorded audio segments.

* * * * *

UNITED STATES PATENT AND TRADEMARK OFFICE

CERTIFICATE OF CORRECTION

PATENT NO. : 7,519,163 B2
APPLICATION NO. : 11/430523
DATED : April 14, 2009
INVENTOR(S) : Timothy A. Cameron et al.

It is certified that error appears in the above-identified patent and that said Letters Patent is hereby corrected as shown below:

CLAIMS

| Column | Line | PTO | Should Read |
|---|---|---|---|
| 16 | 10 | "A system according to claim 1, wherein response data" | -- A system according to claim 1, wherein the response data -- |

Signed and Sealed this

Second Day of June, 2009

JOHN DOLL
*Acting Director of the United States Patent and Trademark Office*